US011273519B2

(12) United States Patent
Sbetti

(10) Patent No.: US 11,273,519 B2
(45) Date of Patent: *Mar. 15, 2022

(54) METHOD AND A MACHINE OF LASER PROCESSING OF A METALLIC MATERIAL

(71) Applicant: ADIGE S.p.A., Levico Terme (IT)

(72) Inventor: Maurizio Sbetti, Levico Terme (IT)

(73) Assignee: ADIGE S.p.A., Levico Terme (IT)

( * ) Notice: Subject to any disclaimer, the term of this patent is extended or adjusted under 35 U.S.C. 154(b) by 407 days.

This patent is subject to a terminal disclaimer.

(21) Appl. No.: 16/309,623

(22) PCT Filed: Jul. 6, 2017

(86) PCT No.: PCT/IB2017/054067
§ 371 (c)(1),
(2) Date: Dec. 13, 2018

(87) PCT Pub. No.: WO2018/007967
PCT Pub. Date: Jan. 11, 2018

(65) Prior Publication Data
US 2019/0151985 A1 May 23, 2019

(30) Foreign Application Priority Data
Jul. 6, 2016 (IT) .................. 102016000070352

(51) Int. Cl.
*B23K 26/06* (2014.01)
*B23K 26/073* (2006.01)
(Continued)

(52) U.S. Cl.
CPC .......... *B23K 26/0604* (2013.01); *B23K 26/06* (2013.01); *B23K 26/073* (2013.01);
(Continued)

(58) Field of Classification Search
CPC .. B23K 26/0604; B23K 26/082; B23K 26/06; B23K 26/073; B23K 26/14; B23K 26/38; G02B 26/0825
(Continued)

(56) References Cited

U.S. PATENT DOCUMENTS 4,202,605 A * 5/1980 Heinz .................... G02B 26/06
359/845
4,942,588 A * 7/1990 Yasui ...................... H01S 3/034
372/103
(Continued)

FOREIGN PATENT DOCUMENTS

EP 1918062 A1 * 5/2008 ......... B23K 26/0604
JP 2001038485 A 2/2001
WO 2008052547 A1 5/2008

OTHER PUBLICATIONS

Olsen et al. "Multibeam Fiber Laser Cutting" Journal of Laser Applications, vol. 21, No. 3, Aug. 2009, pp. 133-138.

*Primary Examiner* — Phuong T Nguyen
(74) *Attorney, Agent, or Firm* — Arent Fox LLP; Michael Fainberg

(57) ABSTRACT

A method of laser processing of a metallic material is described, by means of a focused laser beam having a predetermined transverse power distribution on at least one working plane of the metallic material, comprising the steps of:
  providing a laser beam emitting source;
  leading the laser beam along a beam transport optical path to a working head arranged in proximity to the material;
  collimating the laser beam along an optical axis of propagation incident on the material;
  focusing the collimated laser beam in an area of a working plane of the material; and
(Continued)

conducting said focused laser beam along a working path on the metallic material comprising a succession of working areas,
wherein the laser beam is shaped:
by reflecting the collimated beam by means of a deformable controlled surface reflecting element having a plurality of independently movable reflection areas, and
by controlling the arrangement of the reflection areas to establish a predetermined transverse power distribution of the beam on at least one working plane of the metallic material as a function of the area of the current working plane and/or of the current direction of the working path on the metallic material.

20 Claims, 20 Drawing Sheets

(51) Int. Cl.
*B23K 26/14* (2014.01)
*G02B 26/08* (2006.01)
*B23K 26/082* (2014.01)
*B23K 26/38* (2014.01)

(52) U.S. Cl.
CPC ............ *B23K 26/082* (2015.10); *B23K 26/14* (2013.01); *B23K 26/38* (2013.01); *G02B 26/0825* (2013.01)

(58) Field of Classification Search
USPC ............................ 219/121.6–121.86, 121.72
See application file for complete search history.

(56) References Cited

U.S. PATENT DOCUMENTS

| | | |
|---|---|---|
| 5,101,091 A | 3/1992 | Grub et al. |
| 9,463,529 B2 * | 10/2016 | Miyamoto ............. B23K 26/38 |
| 2002/0008091 A1 | 1/2002 | Brandinger et al. |
| 2010/0206857 A1 * | 8/2010 | Bea ................... B23K 26/0734 219/121.64 |

* cited by examiner

METHOD AND A MACHINE OF LASER PROCESSING OF A METALLIC MATERIAL

CROSS-REFERENCE TO RELATED APPLICATIONS

This application is the U.S. National Stage Application of International Patent Application No. PCT/IB2017/054067, filed on Jul. 6, 2017, which claims priority to Italian Patent Application No. 102016000070352, filed on Jul. 6, 2016, the contents of each of which is incorporated herein by reference in its entirety.

FIELD OF DESCRIPTION

The present invention relates to the laser processing of a metallic material, more specifically, a laser processing method for cutting, drilling or welding of said material, as specified in the preamble of independent claim 1.

BACKGROUND OF THE INVENTION

According to other aspects, the present invention relates to a machine for laser processing of a metallic material arranged to implement the laser processing method, and a computer program comprising one or more code modules for implementing the aforementioned method when the program is executed by electronic processing means.

In the following description and the claims, the term "metallic material" is used to define any metallic workpiece such as a sheet or elongated profile having indifferently a closed cross-section—for example a hollow circular, rectangular or square form—or an open one—e.g. a flat section or a section in the form of an L, C, U, etc.

In industrial metal processing methods, and in particular those of metallic sheets and profiles, the laser is used as a thermal tool for a wide variety of applications that depend on the interaction parameters of the laser beam with the material being processed, specifically on the energy density per incidence volume of the laser beam on the material and on the interaction time interval.

For example, by directing a low energy density (on the order of tens of W per $mm^2$ of surface) for a prolonged time (on the order of seconds), a hardening process is achieved, while directing a high energy density (on the order of tens of MW per $mm^2$ of surface) for a time on the order of femtoseconds or picoseconds, a photo-ablation process is achieved. In the intermediate range of increasing energy density and decreasing working time, the control of these parameters enables welding, cutting, drilling, engraving and marking processes to be carried out.

In many processes, including drilling and cutting processes, an assist gas flow must be provided to the working region wherein the interaction between the laser beam and the material occurs which has the mechanical functions of propulsion of the molten material, or the chemical functions of assisting the combustion, or even the technological functions of shielding from the environment surrounding the working region.

In the field of laser processing of metallic materials, laser cutting, drilling and welding are processing operations that may be carried out by the same machine, which is adapted to generate a high-powered focused laser beam having a predetermined transverse power distribution on at least one working plane of the metallic material, typically a laser beam with a power density ranging from 1 to 10000 $kW/mm^2$, and to govern the beam direction and position of incidence along the material. The difference between the different types of processing that may be performed on a material is substantially ascribable to the power of the laser beam used and the time of interaction between the laser beam and the material subject to processing.

Laser processing machines according to the prior art are shown in FIGS. 1 and 2.

FIG. 1 schematically shows an industrial processing machine with a $CO_2$ laser with an optical path of the laser beam in the air, which comprises an emitting source 10, such as a $CO_2$ laser generator device, capable of emitting a single-mode or multi-mode laser beam B, and a plurality of reflective mirrors 12a, 12b, and 12c adapted to conduct the laser beam emitted from the emitting source along a beam transport optical path towards a working head, indicated collectively at 14, arranged in proximity of a material WP. The working head 14 comprises an optical focusing system 16 of the laser beam, generally consisting of a focusing lens, adapted to focus the laser beam along an optical axis of propagation incident on the metallic material. A nozzle 18 is arranged downstream of the focusing lens and is crossed by the laser beam directed towards an area of a working plane of the material. The nozzle is adapted to direct a beam of an assist gas injected by a corresponding system not shown toward the working area on the material. The assist gas is used to control the execution of a working process as well as the quality of the processing obtainable. For example, the assist gas may comprise oxygen, which favors an exothermic reaction with the metal, allowing the cutting speeds to be increased, or an inert gas such as nitrogen which does not contribute to the fusion of the material but protects the material from unwanted oxidation at the edges of the working profile, protects the working head from any splashes of molten material and may also be used to cool the sides of the groove produced on the material, confining the expansion of the thermally altered area.

FIG. 2 shows schematically an industrial processing machine with the laser beam channeled through fiber optics. It comprises an emitting source 10, such as a laser generating device capable of feeding a laser beam into a transport fiber, for example a laser fiber doped with ytterbium, or a direct diode laser, adapted to emit a single-mode or multi-mode laser beam, and a fiber optic cable 12d adapted to conduct the laser beam emitted from the emitting source to the working head 14 arranged in proximity to the material M. At the working head, the laser beam emerging from the fiber with its divergence controlled is collimated by a dioptric collimating system 20 and reflected by a catoptric system 22 before being focused through an optical focusing system 16, generally consisting of a focusing lens, along an optical axis of propagation incident on the WP material passing through the emitting nozzle 18.

FIG. 3 illustrates an exemplary working head 14 according to the prior art. At 30 a tubular channel is represented having cylindrical or conical sections within which the laser beam is transmitted, indicated at B. The laser beam B generated by the emitting source 10 and transported to the working head by means of an optical path in air with multiple reflections or in fiber optics collimates on a reflective deflector element 32 that deflects its optical propagation axis in a direction of incidence on the material being processed. The optical focusing system 16 is intermediate between the reflective deflector element 32 and a protective slide 34 arranged downstream, adapted to shield the focusing system from any splashes of molten material, and comprises a lens holder unit 36 to which are coupled mechanical adjustment mechanisms 38 for calibrating the positioning of the lens transversely to the direction of propagation of the beam (X-Y axes) and in the direction of propagation of the beam (Z axis).

The optical processing to which the laser beam is subjected in the working head is diagrammed in FIGS. 4 and 5.

The laser beam B originating from an emitting source S through an optical transport path in the free space or in the fiber reaches the working head with a predetermined divergence. An optical collimation system, shown in FIG. 4 by the lens C, provides for collimating the laser beam B, directing it to an optical focusing system arranged downstream, represented by the lens F, capable of producing a focused laser beam. At first approximation, an ideal laser beam, i.e. a laser beam ideally collimated in parallel rays, downstream of an optical focusing system is concentrated on a focal point according to the laws of geometric optics. Physical laws of diffraction, however, indicate that the laser beam even in the best collimation and focusing configuration has, downstream of the optical focusing system, a finite focal spot at its waist. This is represented in FIG. 4 by the region indicated W, which corresponds to the focal area of the beam B. Generally, in industrial processing uses, the working plane of a material coincides with the transversal plane at the waist of the beam.

FIG. 5 shows the distribution of the power density of a normally collimated laser beam, which is typically Gaussian in shape with rotational symmetry in the case of a single-mode beam, i.e. with power concentrated around the longitudinal axis of the beam (Z axis) and gradually decreasing along a peripheral skirt, or it may be described as the envelope of Gaussian profiles with rotational symmetry in the case of a multi-mode beam.

The use of beams with a single-mode or multi-mode laser radiation, which may be described in a first approximation as Gaussian, meets technological control requirements in the field of high-power laser applications. Indeed, a Gaussian beam is easily described by a few parameters and is easily controllable in its propagation along an optical transport path from an emitting source to the head of a processing machine because it has the characteristic of propagating itself without modifying the power distribution, whereby it may be described via a radius value and a divergence value in far-field propagation conditions (in which case a geometric optics approximation may be used). In the propagation conditions of the focused beam in the near-field along a working path where the geometric optics approximation is no longer valid, the beam in any case maintains the Gaussian power distribution pattern in each of its cross sections.

A laser beam comprising higher order transverse modes has, on the contrary, a non-Gaussian power distribution. Typically, these conditions are obtained by using diopter systems (optical systems of the transmissive type, i.e. lenses) that modify the beam shape starting from a Gaussian distribution. A typical feature of the optical systems used for this purpose is their "static nature" or "rigidity" with respect to the optical configuration of the machine. In fact, a particular optical system is designed to produce one and only one power distribution geometry, for example a power distribution wider than the Gaussian distribution for cutting operations on thick materials (where "thick" is intended to mean, for a laser with a wavelength in the near infrared, a thickness of about 4 mm to about 20 mm), or a narrow power distribution compared to the Gaussian distribution for fast cutting operations on thin materials (where "thin" is intended to mean a thickness equal to or less than 4 mm) and it is installed in advance in the working head of the machine, whereby the geometry of the power distribution cannot be modified without replacing the optical head system.

Other solutions are known in the art wherein the shape of the laser beam power distribution may be selected between two predetermined states, for example obtained by controlling the beam transport from the source to the working head through the core of the transport fiber or through an intermediate cladding, thereby modifying the effective diameter of the beam entering into the optical collimation system of the working head, or by controlling the BPP (Beam Parameter Product), i.e., the product of the focal spot radius and the semi-divergence angle of the beam, or the divergence at the source, prior to feeding it into the fiber in such a way as to produce downstream of the focusing corresponding beams with different diameters and divergences. In both of these cases, it is not possible to break the rotational symmetry, due to the construction of the devices themselves.

Unlike the above mentioned solutions, it was proposed in the recent past by Professor Fleming Ove Olsen a descriptive model of the cutting process according to which the breakage of the rotational symmetry would bring an advantage to the process: generating a crescent-shaped secondary power distribution behind a primary peak power distribution with a Gaussian form (in the advancing direction of the process) it is possible to irradiate both the advancing front of the cut (by the primary power distribution) and the part of molten material generated by the primary power distribution that tends to descend along the edges of the cutting groove thus produced and which cools rapidly (through the secondary power distribution). Such a model may be implemented according to the prior art through a complicated and bulky apparatus for recombination of a comprehensive laser beam having a power distribution obtained by the combination of a plurality of component laser beams, each of which is generated and controlled independently of the others. The international patent application WO 2008/052547 concerns such a solution. Also in this case, the constructive solution does not allow a machine to be easily and quickly reconfigured during a working process without having to make substantial changes to the structure of the optical components.

Although it is possible to control a laser source or an optical transport system of a laser beam in such a way as to generate transverse electromagnetic modes of a higher order than the fundamental mode $TEM_{00}$ (corresponding to the Gaussian beam), these have the disadvantage of not propagating while being the same, so although generally it is possible to obtain shapes of the transverse power distribution of the laser beam different from the Gaussian shape and possibly with symmetry other than the rotational one, this may only be obtained in a well-defined propagation position (focal plane) of the beam.

For these reasons, in the field of laser processing, there has always been a need to control the propagation of the laser beam so that it has a Gaussian (or approximately Gaussian) transversal power distribution and to establish once and for all the mutual position between the optical axis of propagation of the laser beam and the barycentric axis of the assist gas flow.

This design choice, which in the case of a purely single-mode beam respects the rotational symmetry of the beam and the assist gas flow, respectively dictated by the Gaussian distribution of the power of the laser beam and by the circular section of the mouth of the outflow nozzle of the assist gas, ensures the isotropy of the behavior of each working process (cutting, welding, etc.) with respect to the directions that processing may follow.

The isotropy of the process with respect to the working paths on the material has always been considered advantageous where a laser working process is controlled by electronic processing means according to any paths and geometries, predetermined in CAD/CAM systems.

It is widely believed that a physically "unbalanced" system or without rotational symmetry at the points of incidence of the laser beam and the assist gas on the material results in complexity and difficulties in controlling the working paths, or worse quality of the processing results.

SUMMARY OF THE INVENTION

The object of the present invention is to provide a laser processing method with improved performance in terms of the operating speed, quality of results and cost-effectiveness of the process.

Another object of the present invention is to provide a laser processing method controllable in real time to obtain precise processing results in all operating conditions, achievable without increasing the size of existing machines.

According to the present invention, these objects are achieved via a laser processing method of a metallic material having the features referred to in claim 1.

Particular embodiments are object of the dependent claims the content of which is to be understood as an integral part of the present description.

A further object of the invention is a machine for the laser processing of a metallic material and a computer program, as claimed.

In summary, the present invention draws inspiration from the consideration that controlling the power distribution of a laser beam and possibly the breakage of the rotational symmetry of the beam may allow for better performance in terms of speed, quality and cost-effectiveness of the working process, as it allows the power distribution to be localized or expanded where it is necessary relative to the working path and to exploit a part of the available laser power for operations ancillary to the main processing, for example for heating/maintaining the molten material in a cutting or drilling operation, which facilitates the removal of the same from the material being processed by means of the assist gas flow and allows a purity of the profiles and cutting surfaces to be reached that is higher than that obtainable by processes based on a power distribution of a Gaussian form with the same level of performance.

According to the invention, the application of the aforementioned considerations to the systems of the prior art is achieved by performing an efficient control of the transverse power distribution of the processing laser beam by means of controlling the real-time shaping of the laser beam. The shape of the laser beam is conveniently controlled to obtain on the working plane a transverse power distribution e.g. from among a Gaussian type distribution of a predetermined diameter, an annular (donut) distribution, a flat profile distribution of a predetermined diameter (flat top or top hut), a complex circular symmetry distribution obtainable by concentric overlapping of a Gaussian distribution and an annular distribution externally concentric to the Gaussian distribution, a complex asymmetric distribution comprising a Gaussian-shaped primary peak power distribution and a crescent-shaped secondary power distribution behind the primary power distribution, described in the literature (F. O. Olsen, K. S. Hansen, and J. S. Nielsen, "Multibeam fiber laser cutting", J. Laser Appl., Vol. 21, p. 133, 2009), an astigmatic distribution with elliptical cross-section, and various combinations of the same.

The shape of the laser beam may also be conveniently controlled to determine in the working plane a transverse power distribution corresponding to a plurality (e.g., a pair) of spatially correlated Gaussian beams—for example coupled according to a predetermined relationship of time evolution and adjacent within a delivery zone of the assist gas flow whose mutual position and/or the position relative to the barycenter of the aforementioned distribution within the delivery area of the gas flow may be synchronously or asynchronously controlled over time.

The present invention is based on the principle of using an optical system with controlled deformation known per se in scientific applications for the processing of optical signals (hence of low-power optical radiation) to shape a high-power laser beam for industrial applications.

The application of a controlled deformation optical system in a laser beam optical transport system allows to extend the range of shapes of the laser beam obtainable in a rapidly modifiable manner and consequently to improve performance in the machining processes or to implement innovative machining processes.

Advantageously, the method of the invention allows a laser working process to be controlled in real time by shaping the power distribution of the laser beam around the original optical axis, thus obviating the need to adopt specific optical systems for the respective power distribution geometries depending on the desired application, or to control certain beam parameters in the beam generation or transport stage, that is, far from the working head, which may only be achieved through the intervention of an operator when setting the machine for a predetermined process.

Still more advantageously, the method of the invention allows the transverse power distribution of the laser beam to be controlled according to a plurality of predefined forms with a quick settling time so that such control may not only be performed as a "preparatory setup" in view of a working cycle but may be implemented in real time during a working process so as to control the transverse power distribution of the laser beam along the working path on the material.

In other words, the method of the invention allows a predetermined transverse power distribution strategy of the laser beam to be set automatically and developed during a working process, for example by instantaneously controlling the transverse power distribution of the laser beam at a predetermined working plane of the material relative to its free surface and at a predetermined position and according to a certain orientation relative to the current direction of the working path (the advancing direction of the process).

The method of the invention also allows to automatically set up a variable modification strategy for the transverse power distribution of laser beam during a working process, for example depending on the spatial position of the working area on the material along a predetermined working path, or the instantaneous direction of such path, all as a function, for example, of the thickness of the material being processed. For large thicknesses, for example equal to or greater than 4 mm, the technological need of the process is to create a wide groove, allowing easy removal of the molten material, and maintaining a high viscosity of the molten material itself ensures reduced or no adhesion of the molten material on the walls of the groove itself, ultimately providing a cut free of burrs and with a reduced roughness compared to that obtainable with a Gaussian beam. An asymmetrical distribution of the beam, such as that, for example, wherein the beam is composed of a Gaussian central component and a crescent-shaped component behind the advancing direction, satisfies the need to improve the process and at the same time the need to be rotated with respect to the surface of the material, in accordance with the instantaneous direction of the cutting path, by its nature typically not fixed. In the case of using two beams coupled according to a predetermined time evolution relationship, the invention allows its position both on the plane of incidence on the material and at depth in the thickness of the material itself to be controlled, so as to illuminate instantaneously and at high-frequency a volume of the material while the processing proceeds along a predetermined path (i.e., while the overall optical power distribution follows the front edge of the cut). In this case, too, a reduced viscosity of the molten volume expelled from the groove is obtained.

The control of the transverse power distribution of the beam in an area of the working plane on the metallic material is implemented according to the invention in a predetermined neighborhood of the axis of the assist gas flow defining a delivering zone of said flow. The delivering zone of the assist gas flow—which represents the volumetric field of action of the control method of the invention—is identifiable as the "affected volume" of the nozzle of a working head—a nozzle typically having a mouth whose diameter is between 1 mm and 3.5 mm and dimensions which are typical of a truncated cone with a height of 6 mm to 20 mm, a minor base (at the nozzle) having a diameter equal to the diameter of the nozzle mouth increased by 1 to 3 mm, and a major base whose characteristic dimension is a function of the height of the frustoconical volume and the angle of inclination of the generating line, typically between 15 and 30 degrees. Appropriately, the volume of the nozzle is as small as possible, and it has the slimmest appearance possible so that it may also operate within concavities of the surfaces to be processed.

Advantageously, the automatic control performed by the method of the invention may be carried out in real time with operating frequencies between 100 Hz and 10 kHz.

A control system adapted to carry out the method of the invention is advantageously distinguished from the prior art systems because it may be integrated onto a working head, i.e. it is independent from the generation of the laser beam and from its conveyance to the working head.

Moreover, unlike the known solutions for setting or commissioning a machine for a specific processing, wherein the transverse power distribution of the laser beam may be adjusted via a manual intervention by an operator to replace specific optics, or wherein the modification of the transverse power distribution of the laser beam is implemented among a very limited number of predefined forms, the method of the invention allows to effectively control in real time the transverse power distribution of the laser beam as a function of the localization of the beam along a working path, whereby it is possible to modify the transverse power distribution of laser beam in a precise manner depending on the programmed working conditions that occur at predetermined positions along the working path. Such programmed processing conditions include, by way of non-limiting example, the current working position (or, more generally, the area of the current working plane) along a predetermined working path and/or the current direction of the working path on the material and/or the current direction of translation of the axis of the assist gas flow, as well as the type of processing expected at a certain working position (for example, switching between a drilling, approaching the cut, and cutting process).

In a drilling process of a material, the method of the invention improves the process by making it controllable in real time and more effective, for example by performing a succession of processing operations comprising at least a first stage including an irradiation of a predetermined series of first narrow beam pulses at a predetermined fixed position on the working material, and a second phase including an irradiation of a laser beam advancing along a predetermined working path with an expanding diameter to allow the release of the molten material.

According to a further example of a drilling process, a succession of processing operations is performed comprising—in a first step—an irradiation of a predetermined first series of narrow beam pulses at a predetermined drilling coordinate on the working material, whose propagation axis is centered in the affected volume of the assist gas flow, and—in a second step—an irradiation (continuous or pulsed) of a laser beam according to a circular or spiral movement concentric to said predetermined drilling coordinate, adapted to "scramble" the molten material while the drilling is being concluded.

In a cutting process of a material, the method of the invention allows the process to be improved by making it controllable in real time and more effective, for example by performing a succession of processing operations comprising:

the modification of the beam diameter as a function of the local thickness of the material to be cut or of the specific cutting operation required (e.g. continuous groove cutting or bevel with sloping edge); and/or the contextual modification of the beam power distribution in favor of a flat profile mode in order to reduce, compared to the Gaussian distribution, the percentage of power of the laser beam irradiated both at the center of the cutting groove and its sides, which would otherwise be unnecessarily heated so generating a dispersion of energy by lateral conduction resulting in the generation of low temperature molten material, which is redeposited before exiting the groove, creating burrs; and/or the contextual modification of the beam power distribution in favor of an annular type mode, possibly combined by overlapping with an axially localized Gaussian distribution, adapted to increase the temperature of the tail of the molten material, so as to eliminate the burrs; and/or the breakage of the rotational symmetry and the distribution of each of the forms previously described in the cutting direction, and the corresponding truncation in the other directions and in the direction of expelling the material from the groove; and/or the breakage of the rotational symmetry and the emphasis on the power distribution in the advancing direction of the processing, by an elliptical beam instantaneously directed along the cutting direction.

Advantageously, in addition to achieving different transverse power distributions of the laser beam, the invention also concerns the ability to control two other dimensions of the process: depth and time.

In fact, the transverse power distributions described above may only be obtained in a well-defined focal plane, with a coherence interval (or "thickness") along the beam's direction of propagation (caustics of the beam around the better focusing plane) which depends on the optical focusing system used. The technical solution of the invention allows the position of the focal plane to be controlled along the direction of propagation of the beam wherein the desired power distribution is established, so that the depth of the working plane relative to the surface of the material is a further process parameter modifiable online. This feature is relevant because it allows three-dimensional flexibility in controlling a working process of a material which is different than in the systems of the known art, including scanner systems with galvanometric mirrors, which typically have only one focal position, which may not be adjusted other than by moving the entire working head with respect to the material.

Moreover, by quickly controlling the distribution of the beam and its positioning in space, i.e., at frequencies greater than those corresponding to the typical interaction times of the process (above 100 Hz, but also up to 10 kHz) it is possible to define an apparent volume of interaction between the laser beam and the material of an arbitrary form by simply controlling in a reduced time a sequence of beam power distributions, the envelope of which constitutes said apparent volume.

BRIEF DESCRIPTION OF DRAWINGS

Further features and advantages of the invention will be described in greater detail in the following detailed description of one embodiment thereof, given by way of non-limiting example, with reference to the accompanying drawings wherein:

FIG. 10b is a graph showing the three-dimensional configuration of the surface of the deformable, controlled surface reflective element, adapted to generate the transverse power distribution of FIG. 10a;

FIG. 11b is a graph showing the three-dimensional configuration of the surface of the deformable, controlled surface reflective element, adapted to generate the transverse power distribution of FIG. 11a;

FIG. 12b is a graph showing the three-dimensional configuration of the deformable, controlled surface reflecting element, adapted to generate the transverse power distribution of FIG. 12a;

FIG. 13b is a graph showing the three-dimensional configuration of the surface of the deformable, controlled surface reflecting element, adapted to generate the transverse power distribution of FIG. 13a;

FIG. 14b is a graph showing the three-dimensional configuration of the deformable, controlled surface reflecting element, adapted to generate the transverse power distribution of FIG. 14a;

FIG. 15b is a graph showing the three-dimensional configuration of the surface of the deformable, controlled surface reflecting element, adapted to generate the transverse power distribution of FIG. 15a;

DETAILED DESCRIPTION

FIGS. 1 through 5 have been previously described with reference to the prior art and their contents are hereby referred to as being common to the manufacture of a processing machine controlled for carrying out a working process according to the teachings of the present invention.

Figure 1:
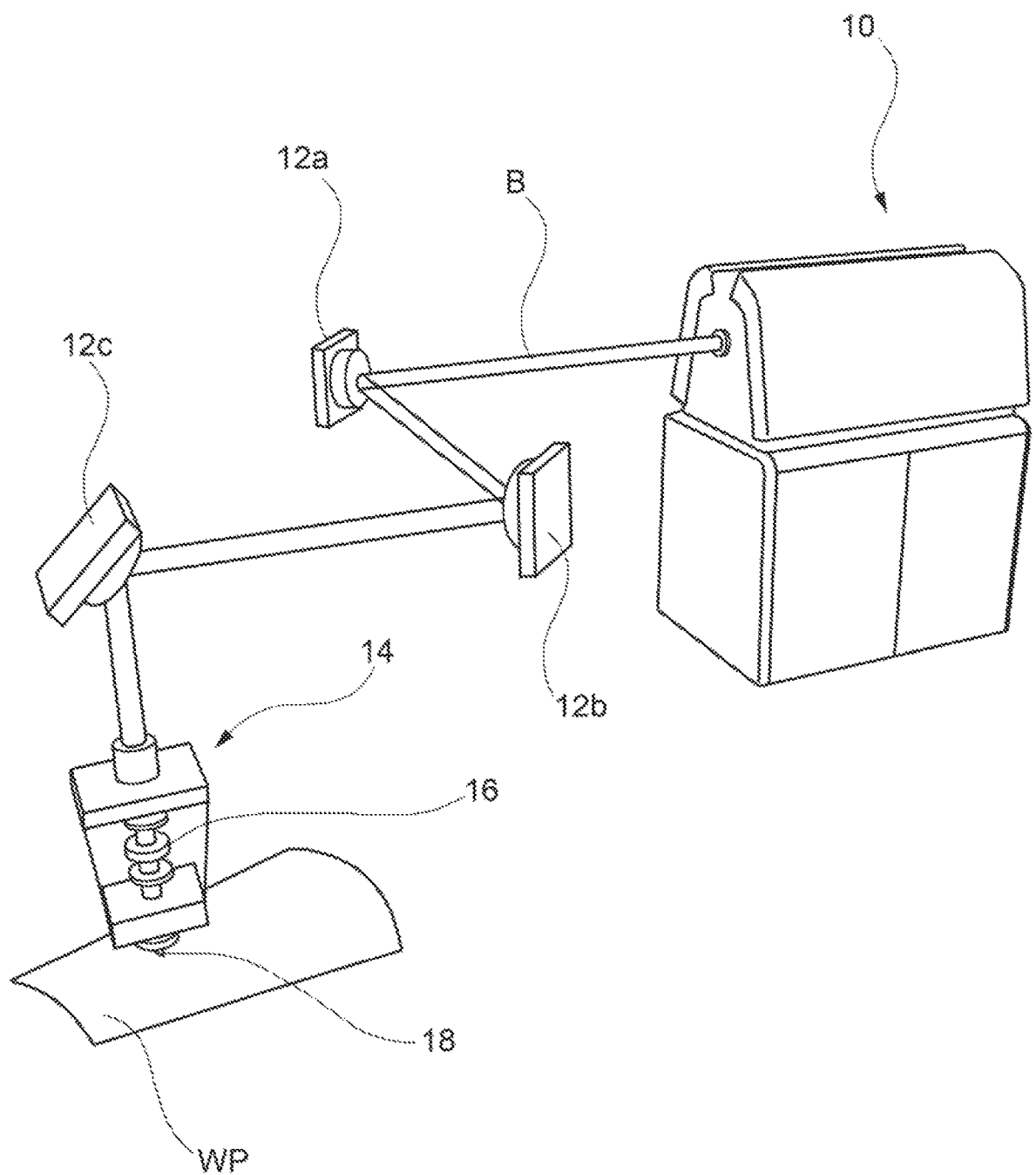
FIGS. 1 and 2 are examples of machines for laser processing according to the prior art.
Figure 2:
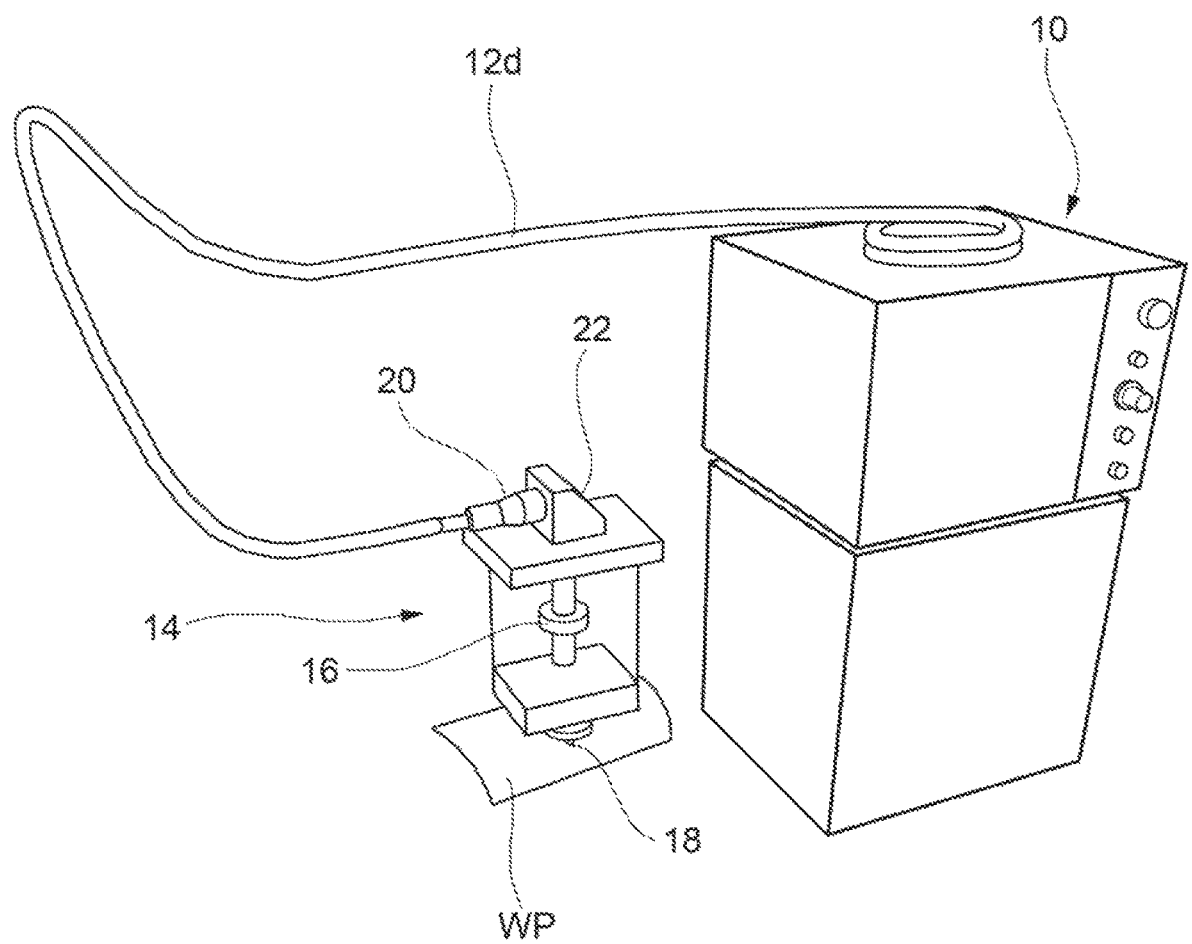
Figure 3:
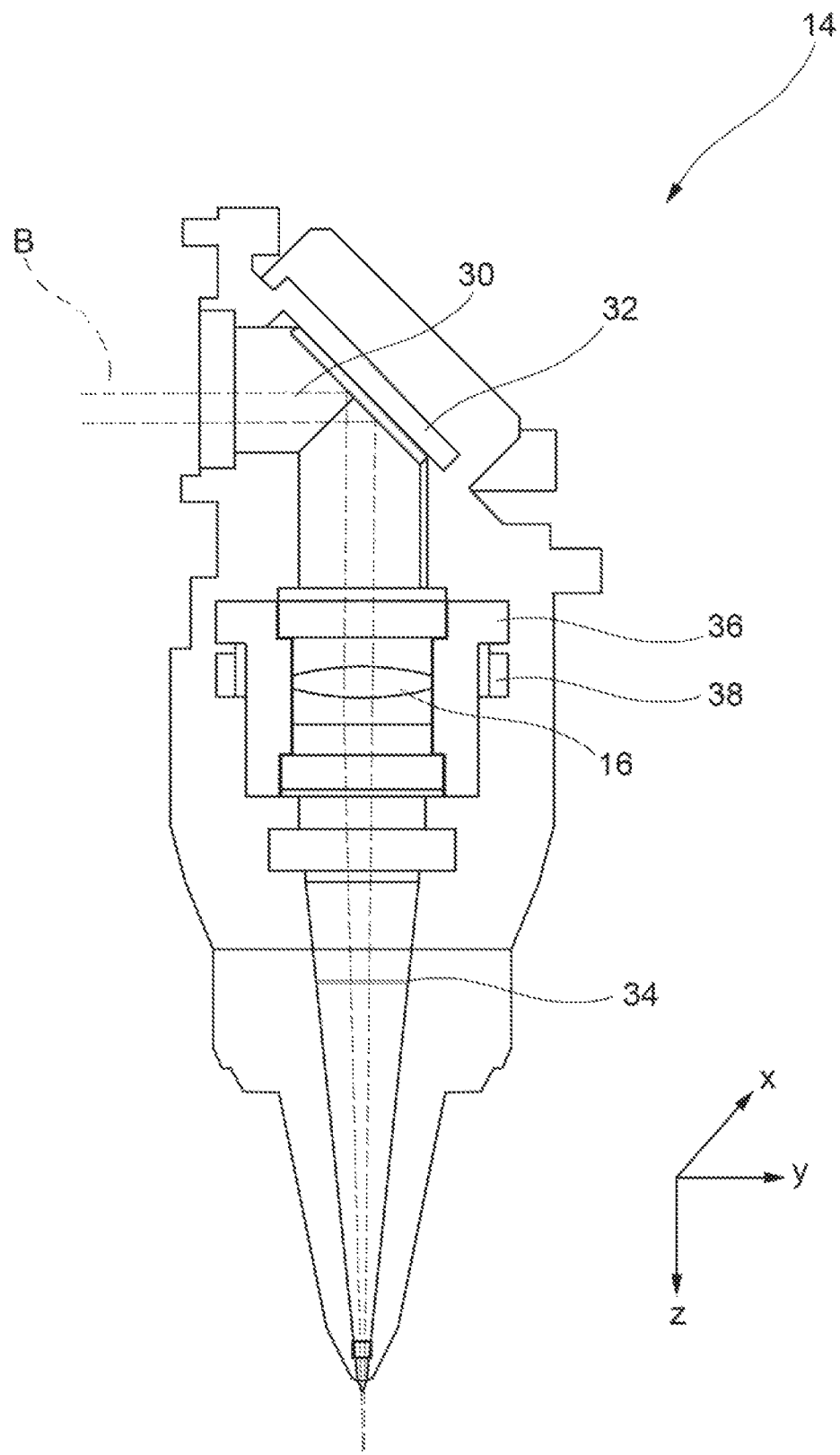
FIG. 3 shows an example of the structure of a working head of a laser machine according to the prior art.
Figure 4:
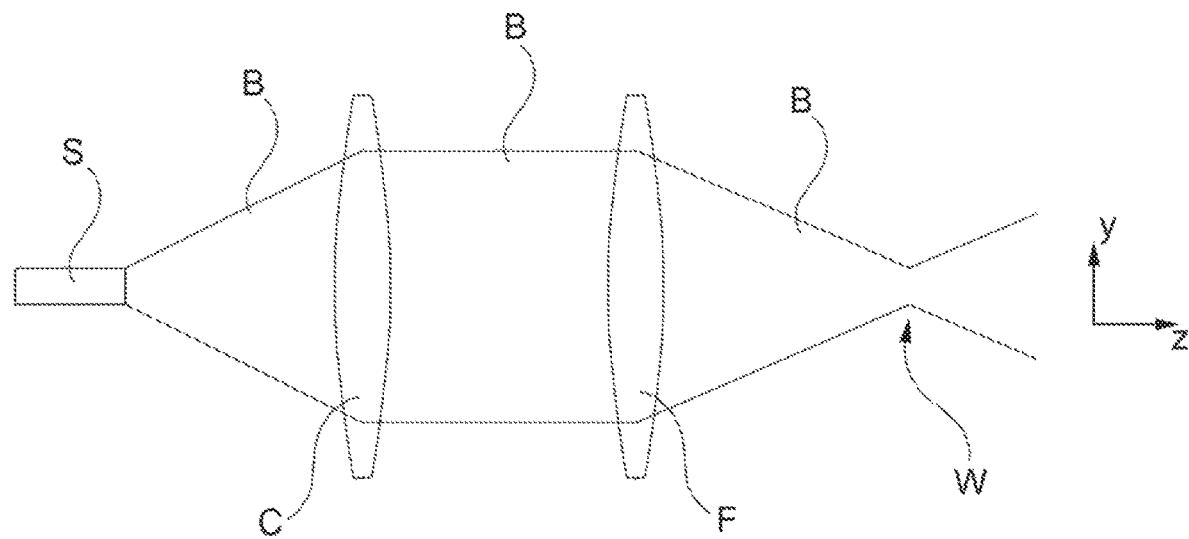
FIGS. 4 and 5 show a schematic representation of the shape of a laser beam for applications of industrial processing of metallic materials according to the prior art.
Figure 5:
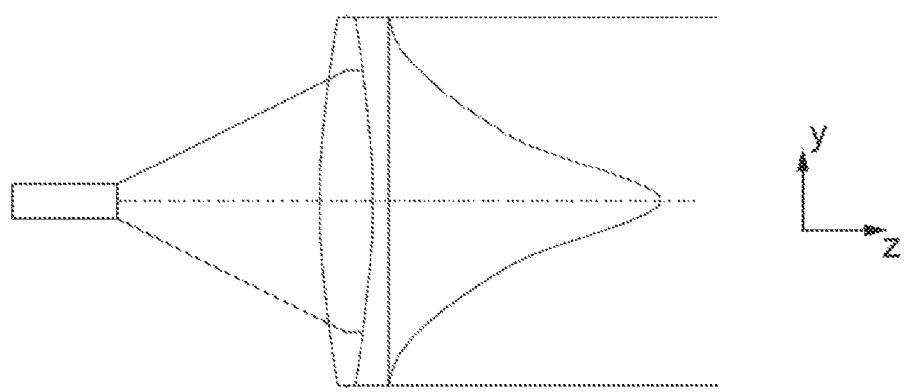
Figure 6:
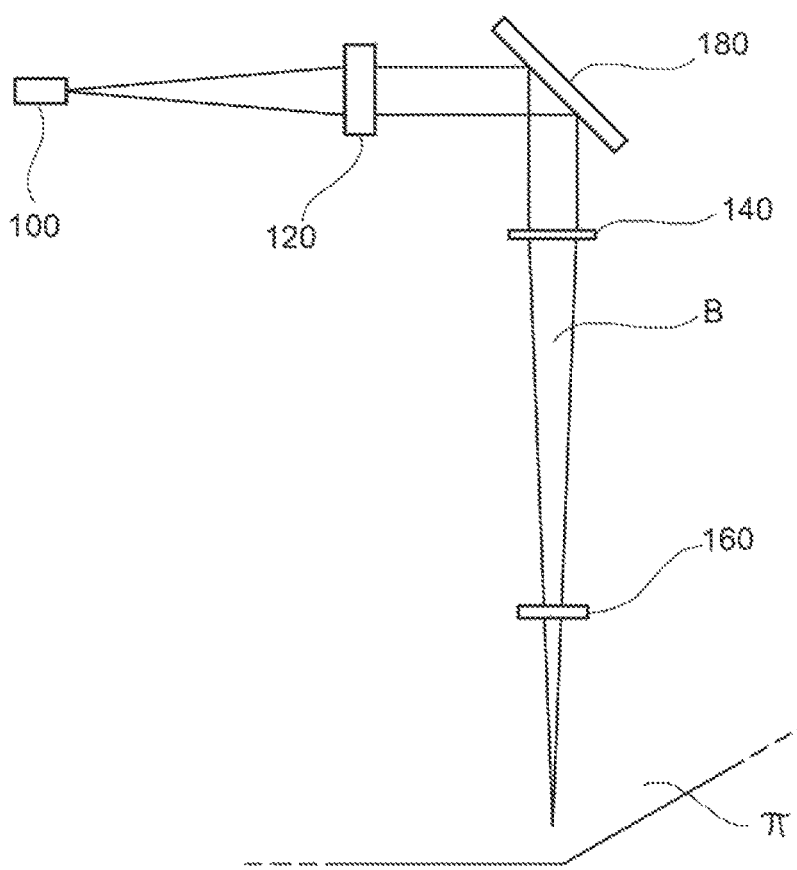
FIG. 6 is a schematic diagram of an optical path of a laser beam in a working head adapted to perform the method of the invention.

An optical path of a laser beam in the working head of a machine for the laser processing of metallic materials according to the invention is diagrammed in FIG. 6.

The optical system of FIG. 6 comprises an input device 100 of a laser beam B, such as e.g. the end of a fiber optic cable or an optical pickup system of a beam propagated by an emitting source along an optical path in free space, from which the laser beam B emerges with a predetermined divergence.

Downstream of the input device 100, an optical collimation system 120 is arranged, for example a collimation lens (typically a collimation lens for a working head of a laser cutting machine has a focal length from 50 mm to 150 mm), downstream of which the collimated laser beam is conducted to an optical focusing system 140, e.g. a focusing lens (typically a focusing lens for a working head of a laser cutting machine has a focal length from 100 mm to 250 mm, in the case of laser welding the focal length may even reach 400 mm), arranged to focus the beam on a working plane H through a screen or protective glass 160.

In the optical path between the collimation optical system 120 and the optical focusing system 140, optical beam shaping means 180 are interposed.

In particular, with reference to the schematization of the optical path of a laser beam shown in FIG. 6, the present invention relates to making optical means 180 for shaping the laser beam and the control of said means for achieving a transverse power distribution of the laser beam in a controlled manner on a predetermined working plane of the material. In the figure, the optical means 180 for shaping the laser beam are shown in an illustrative embodiment wherein they are arranged with their own axis of symmetry at 45° relative to the propagation direction of the beam.

Figure 7:
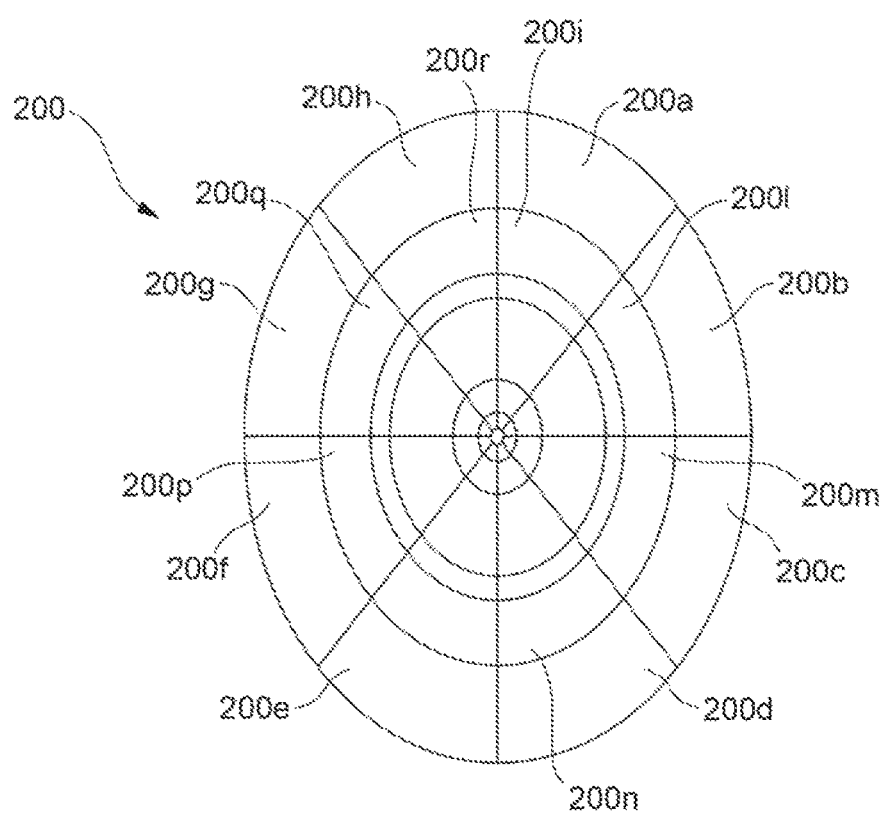
FIG. 7 is a schematic representation of a controlled surface reflecting element for the shaping of the optical beam for the implementation of the method of the invention.

To this end, the optical means 180 for shaping the laser beam are made as a deformable reflecting element 200 with a controlled surface, comprising a plurality of reflection areas independently movable, as diagrammed in FIG. 7, which, in a rest state, define a reflective surface lying on a reference reflection plane. Said deformable, controlled surface reflecting element 200 provides a continuous foil mirror, the reflective surface of which is modifiable three-dimensionally with respect to the reference flat reflective surface adopted in the rest state. Said deformable, controlled surface reflecting element 200 has a reflective surface with continuous curvature including a plurality of reflection areas with which there is associated posteriorly a corresponding plurality of movement modules shown in the figure with 200a, 200b, . . . and is appropriately treated for the use with high optical power by virtue of the joint use of a highly reflective coating (at least 99%) at the wavelength of the laser beam, and a mounting on a contact holder, cooled with water by direct channeling. The movement modules are integral to the continuous curvature reflective surface and are independently movable. The reflection areas of the reflective surface with continuous curvature have no edges between them, i.e., the overall reflective surface has continuous local derivatives in all directions. The movement of said plurality of movement modules 200a, 200b includes translation movements of the corresponding reflection areas, such as forward or backward movements, relative to the reference flat reflective surface adopted in the rest state or rotational movements of the corresponding reflection areas around an axis parallel to the reference flat reflective surface adopted in the rest state, or even a combination of the same.

The deformations of the reflecting surface, i.e. the movements of the movement modules 200a, 200b, are preferably actuated by known piezoelectric techniques, which make it possible to control the movement of the movement modules and the consequent position of the reflection areas, i.e. their modification of position resulting from a combination of movement by translation and/or rotation of each module at a predetermined number of degrees of freedom independently of the others, typically on travels on the order of +/−40 µm, by means of which it is possible to obtain approximations of continuous curvature surfaces defined by combinations of Zernike polynomials, through which it is possible (at least in theory and with sufficient approximation in practice for the desired purposes) to apply an adjustment of the position of the optical propagation axis of the laser beam or more generally a control of the transverse power distribution of the laser beam, according to the objects of the desired processing applications.

FIG. 7 shows a preferred embodiment of the reflector element 200 with an elliptical profile and the related rear movement modules, adopted for an angle of incidence of the collimated laser beam of 45°, as shown in the diagram of FIG. 6. Such embodiment is to be understood as purely illustrative and non-limiting to the implementation of the invention. In a different preferred embodiment, wherein the incidence of the collimated laser beam is perpendicular or almost perpendicular to the surface of the element 200 in the rest state, the profile of the reflective element 200 is a circular profile.

In the embodiment of the reflective element with an elliptical profile, the same has a major axis of 38 mm and a minor axis of 27 mm, corresponding to the maximum transverse aperture size of the laser beam incident on the mirror obtainable by the collimation optical system 120.

Specifically, in a preferred embodiment, said deformable, controlled surface reflecting element 200 includes a plurality of reflection areas independently movable by means of a corresponding plurality of movement modules which comprise a central area and a plurality of ranks of circular crown sectors concentric to said central area. In the currently preferred embodiment, the ranks of concentric circular crown sectors are 6 in number, the circular crown sectors are 8 in number for each rank, and the height of the circular crown sectors increases from the first to the third rank and from the fourth to the sixth ranks in the radial direction to the outside of the reflective element. The height of the circular crown sectors of the fourth rank is intermediate between the height of the circular crown sectors of the first and second rank. Preferably, in order to simplify the control structure of the reflecting element 200 as designed, the plurality of circular sectors forming the peripheral circular crown may be fixed, and only the ranks of the inner circular crown sectors are movable in such a way that they may employ a total number of actuators limited to 41.

In general, the numbers of rows of circular sectors, the number of circular crown sectors and the height of the circular crown sectors are determined according to the reflecting surface geometries necessary for obtaining predetermined desirable transverse power distributions of the laser beam, through simulation procedures of the trends of the transverse power distributions of a laser beam incident on the reflective element for a selected number of reflection areas. In fact, the controlled deformability of the reflection surface of the element 200 induces controlled variations of the intensity of the laser beam on the focal plane by acting on the phase of the laser beam. In the currently preferred embodiment, the deformation of the surface of the reflective element 200 is controlled in such a way as to determine a reflective surface ascribable to a combination of Zernike polynomials. Thus, the distribution of the intensity of the laser beam on the focal plane according to the phase variations controlled by the movement of the reflection areas of the reflective element 200 may be advantageously simulated using mathematical calculation methods.

The geometry of the subdivision of the surface of the reflecting element 200 illustrated in FIG. 7—corresponding to the geometry of the movement modules of the reflection areas—has been determined by the inventors through a simulation procedure to obtain different forms of transverse power distribution with a great freedom in beam shaping, even not related to the retention of the rotational symmetry thereof. Otherwise, for applications strictly related to the Gaussian power distribution, wherein a change in the shape of the power distribution is not required, but only the displacement thereof with respect to the optical propagation axis, it is possible to use simpler geometries, for example equally spaced ranks, i.e. wherein the height of the circular crown sectors is constant among all the ranks of the sectors. For applications wherein a rotational symmetry of the beam power distribution is to be retained, it is possible to provide for a plurality of reflection areas and respective movement modules in the form of radially independent circular crowns.

Figure 8:
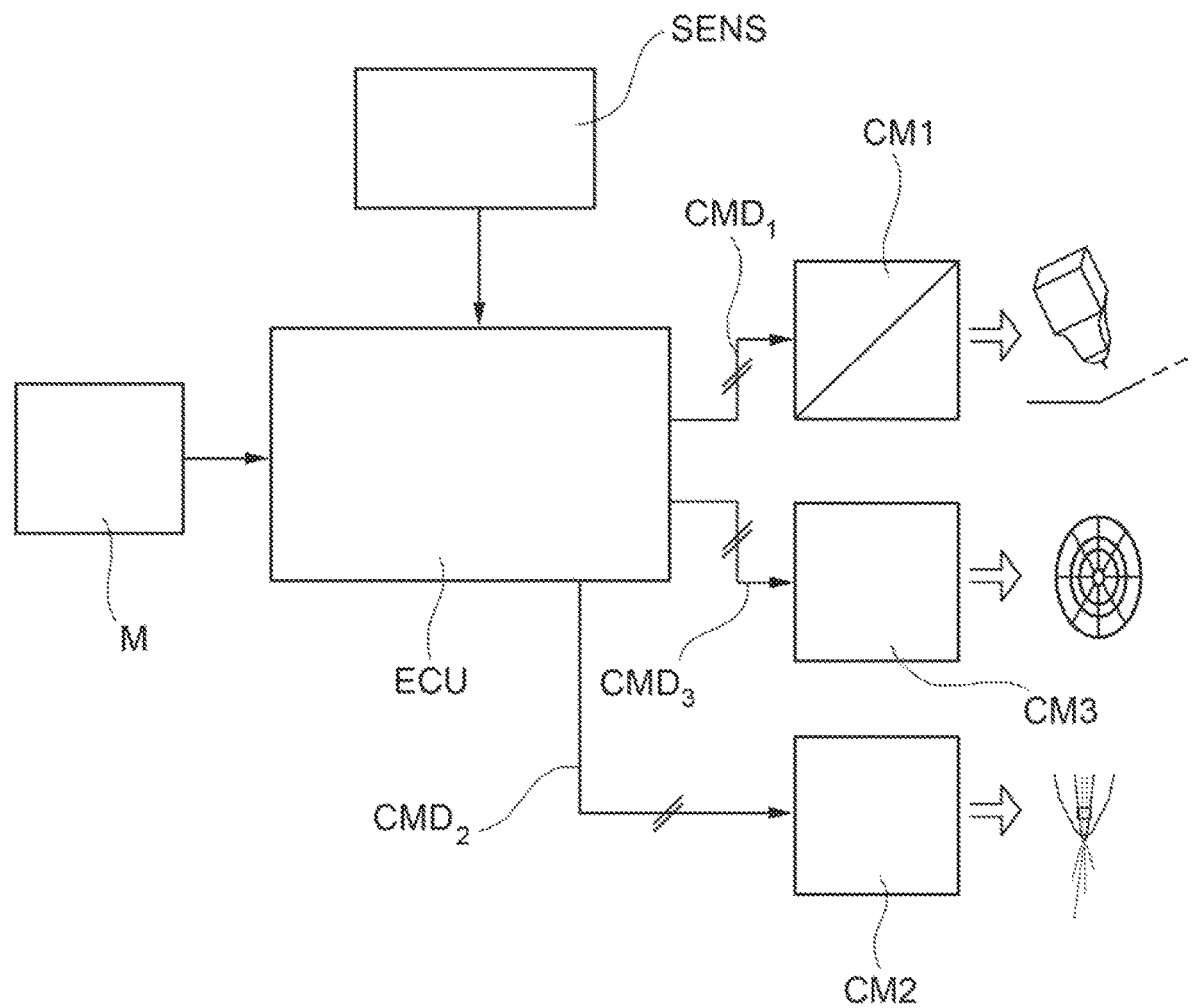
FIG. 8 is a block diagram of control electronics of a laser processing machine, adapted to perform a processing method according to the invention.

FIG. 8 shows a circuit diagram of an electronic control system of a machine for the laser processing of metallic materials for the implementation of the method of the invention.

The system comprises electronic processing and control means shown in the figure collectively at ECU, which may be integrated into a single processing unit on board a machine or implemented in a distributed form, thus comprising processing modules arranged in different parts of the machine, including, for example, the working head.

Memory means M associated with the electronic processing and control means ECU store a predetermined processing pattern or program, for example comprising a predetermined working path in the form of movement instructions for the working head and/or for the material being processed, and physical processing parameters indicating the power distribution of the optical beam, the power intensity of the beam, and laser beam activation times as a function of the working path.

The electronic processing and control means ECU are arranged for accessing the memory means M to acquire a working path and to control the application of the processing laser beam along said path. The control of the application of the laser beam along the predetermined working path includes the control of the delivery of an assist gas flow and the control of the radiation of a predetermined power distribution of the laser beam toward a predetermined working area by reference to the predetermined processing pattern or program, i.e., according to the working path information and working parameters acquired from the memory means.

The sensor means SENS are arranged on board the machine to detect in real time the mutual position between the working head and the material being processed as well as the change over time of such position.

The electronic processing and control means ECU are arranged to receive from the sensor means SENS signals indicative of the mutual position between the working head and the material being processed over time, i.e. the change of the area of the current working plane and/or of the current direction of the working path over time.

The electronic processing and control means ECU comprise a first control module CM1 for controlling the mechanical parameters of the processing, arranged to emit first command signals $CMD_1$ to a known assembly of actuator means, comprising actuator means for moving the working head along the degrees of freedom allowed to it by the specific embodiment of the machine and actuator means for moving the material being processed with respect to the position of the working head, adapted to cooperate with the actuator means for moving the working head to present a programmed working path on the material being processed at the nozzle of the working head. These actuator means are not described in detail because they are known in the art.

The electronic processing and control means ECU comprise a second control module CM2 for controlling the physical parameters of the processing, arranged to emit second command signals $CMD_2$ to assist gas flow delivery means and control means for generating and transmitting the laser beam.

The electronic processing and control means ECU comprise a third control module CM3 for controlling the optical processing parameters, arranged to emit third command signals $CMD_3$ to the deformable, controlled surface reflecting element 200 of the optical beam shaping means for the implementation of the movement modules of the independently movable reflection areas of said element, i.e. to control their mutual spatial displacement (translation along the optical axis of the reflecting element or inclination relative to it). The command signals $CMD_3$ are processed by means of a computer program comprising one or more code modules having instructions of a control model or program for the implementation of the method of the invention according to the predetermined shaping of the laser beam to be obtained, i.e. to establish a predetermined transverse power distribution of the laser beam, and consequently a predetermined position of the optical propagation axis of the laser beam, as a function of the instantaneous processing conditions along an optical propagation axis incident on the material in an area of at least one working plane of the metallic material, the working plane of the material being the surface plane of the material or a plane which varies in depth in the thickness of the material, e.g. for cutting or drilling of thick materials, i.e. typically with thicknesses greater than 1.5 times the Rayleigh length of the focused beam (in the typical case, thicknesses greater than 4 mm and up to 30 mm). The aforementioned command signals $CMD_3$ are also processed by the computer program to establish the predetermined transverse power distribution of the laser beam in a predetermined neighborhood of the axis of the assist gas flow and within a delivering area of said flow according to the instantaneous working conditions, i.e., the area of the current working plane and/or the current direction of the working path on the metallic material.

The electronic processing and control means ECU are therefore arranged to detect the current position and/or the current translation direction of the axis of the assist gas flow to control the relative translation of the axis of the assist gas flow along a predetermined working path on the metallic material and to automatically adjust the position of the optical propagation axis of the laser beam or to automatically control the transverse power distribution of the laser beam according to the current position and/or the detected current direction of translation of the axis of the assist gas flow.

Figure 9:
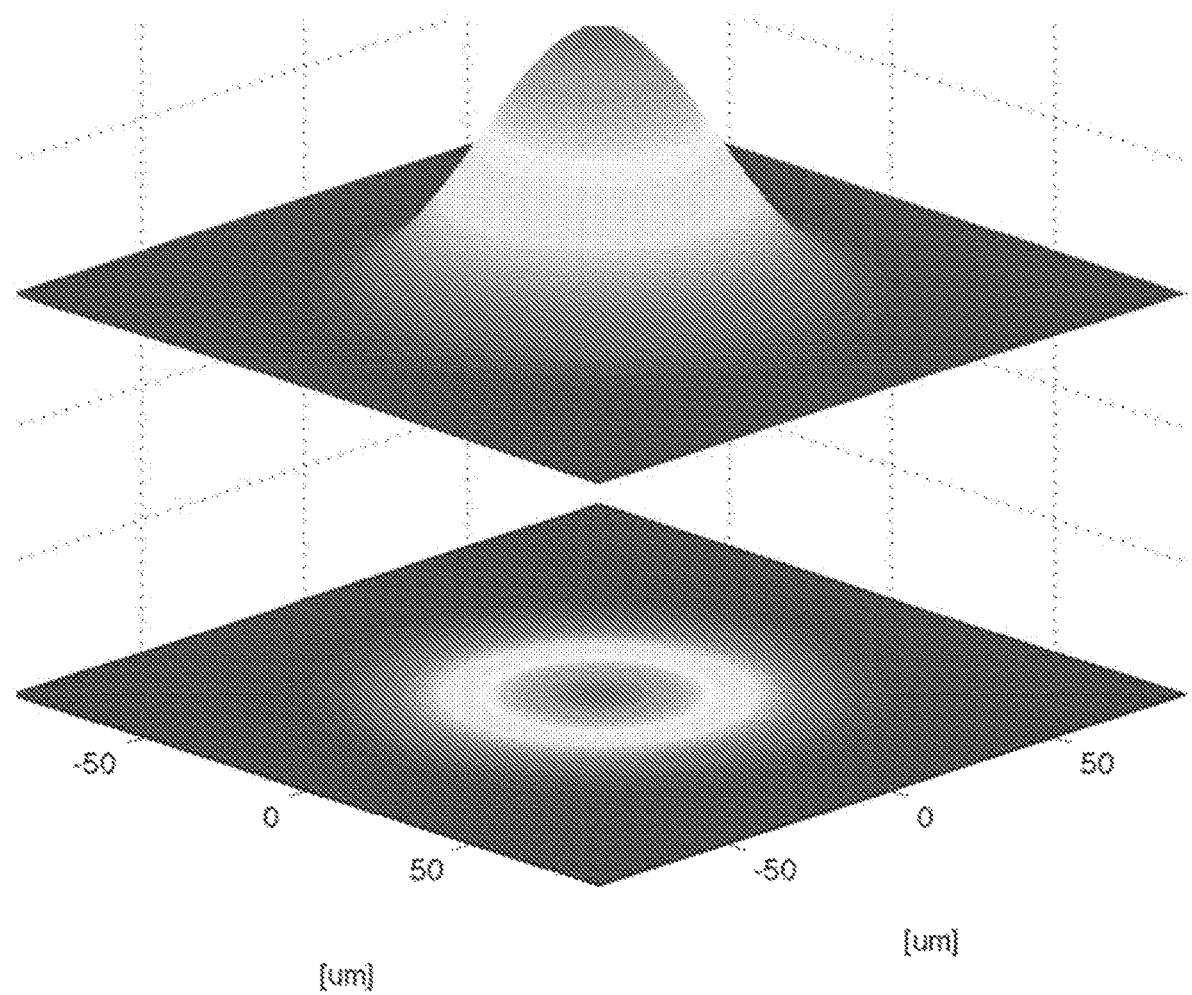
FIG. 9 is a graph showing a Gaussian-shaped transverse power distribution, respectively by means of a three-dimensional representation of the beam's intensity and a two-dimensional representation of the distribution of the beam's intensity in the transverse focusing plane.

A conventional power distribution of a laser beam with a Gaussian profile in a section transverse to the propagation direction corresponding to the working plane is shown in FIG. 9, where the upper graph is a three-dimensional representation of the normalized intensity of the beam and the lower graph is a two-dimensional representation of the intensity distribution of the beam in the focusing plane for a typical beam having a focusing spot radius on the area of the working plane of the order of 60 microns.

According to an embodiment of the method of the invention, an arrangement of the reflection areas of the deformable, controlled surface reflecting element is implemented adapted to establish a transverse power distribution of the beam in an area of the working plane on the metallic material having a Gaussian profile of a predetermined diameter. This arrangement of the reflection areas allows a spherical surface of the deformable reflective element, which is convex or concave relative to the reference planar surface, in the case of an almost normal incidence, or a toric surface proportional to an elliptical elongation, in the case of an incidence at 45 degrees. In this condition, the beam undergoes a variation of divergence (albeit minimal). The resulting transverse power distribution of the beam finds applications in cases where it is necessary to move the position of the focal point among different working planes of the material, or to widen or narrow the diameter of the incident beam on the surface of the material itself.

Figure 10A:
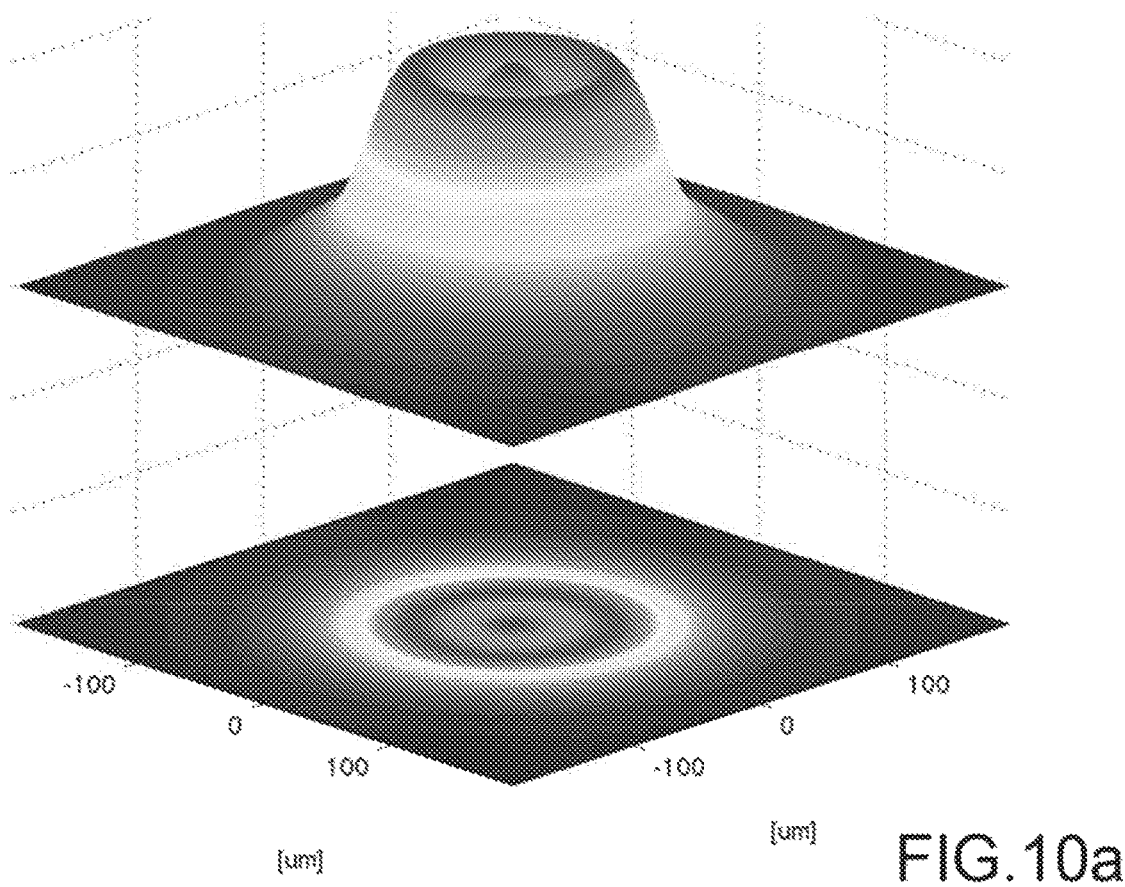
FIG. 10a is a graph showing a flat profile transverse power distribution, respectively by means of a three-dimensional representation of the beam's intensity and a two-dimensional representation of the distribution of the beam's intensity in the transverse focusing plane.
Figure 10B:
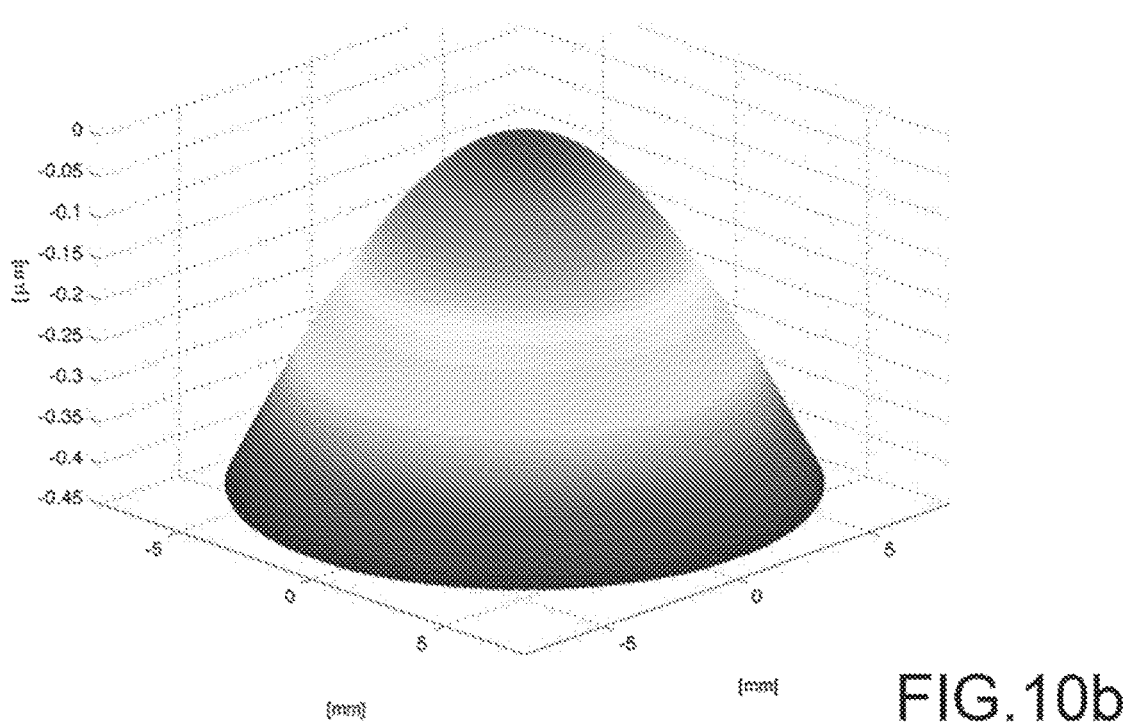
Figure 10C:
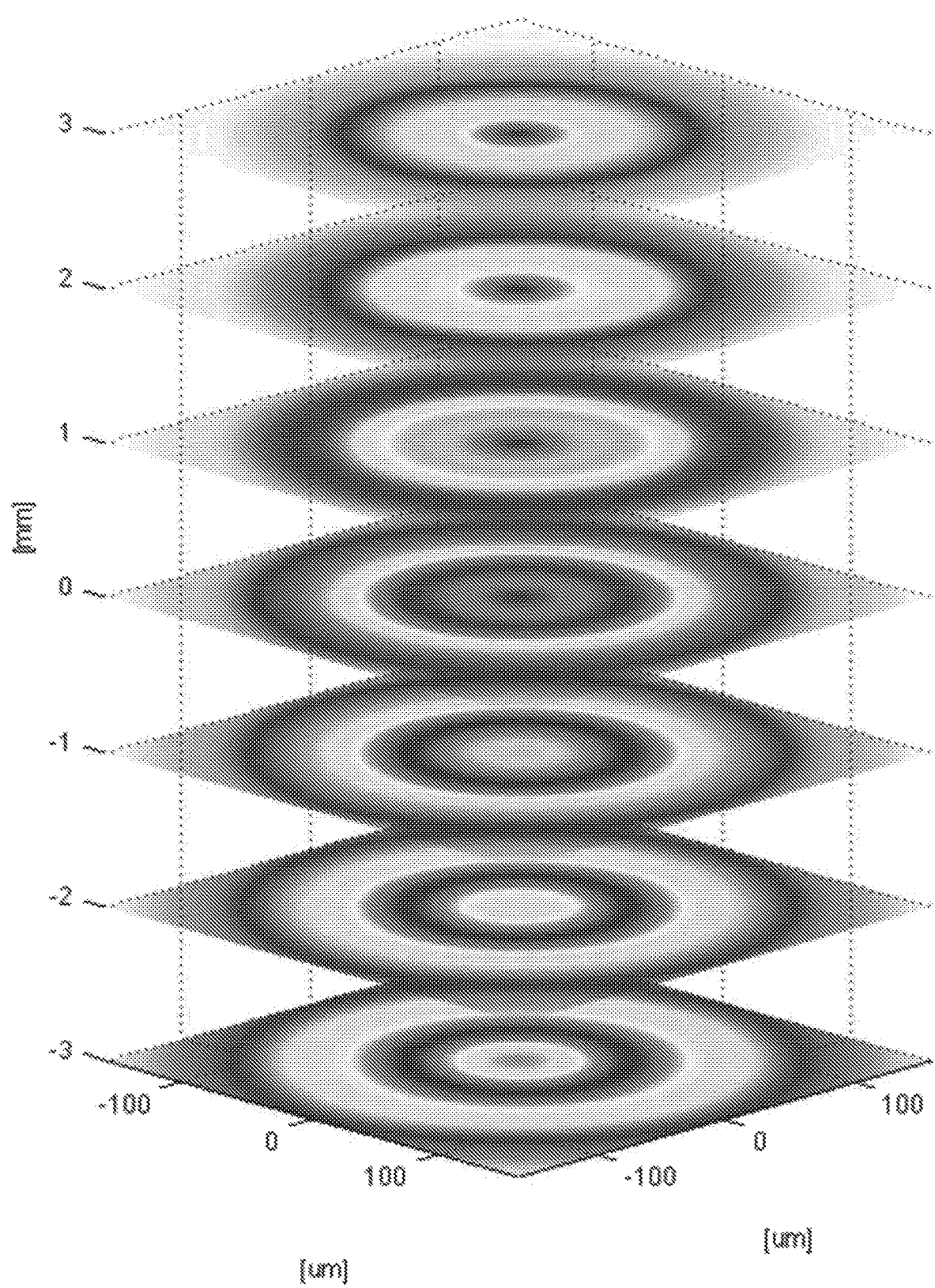
FIG. 10c is a graph showing the evolution of the beam's distribution of intensity (in two-dimensional representation) along the propagation direction of the same beam, which has a flat profile on the working plane.

According to a further embodiment of the method of the invention, an arrangement of the reflection areas of the deformable, controlled surface reflecting element is implemented adapted to establish a transverse power distribution of the beam in an area of the working plane on the metallic material having a flat profile (flat top or top hut) of a predetermined diameter. The flat profile power distribution is shown in FIG. 10a, where the upper graph is a three-dimensional representation of the normalized intensity of the beam and the lower graph is a two-dimensional representation of the intensity distribution of the beam in the focal plane, for a typical beam having a focal spot radius on the working plane area of the order of 120 microns. FIG. 10b graph shows the three-dimensional configuration of the surface of the deformable, controlled surface reflecting element, wherein the axes of the graph are not to scale, the vertical axis being expressed in microns (as opposed to the horizontal axes expressed in millimeters) to allow a better view of the profile. The maximum travel of the movement modules of the moveable reflection areas is on the order of 0.5 micron. The evolution of the beam's intensity distribution along the propagation direction is shown in the graph in FIG. 10c where the change in power distribution is simulated at different depths from the working plane (indicated by the coordinate 0 along the vertical axis z). In particular, the evolution of power distribution has been simulated in a depth range between 3 millimeters over and 3 millimeters below the working plane, with steps of 1 millimeter.

Figure 11A:
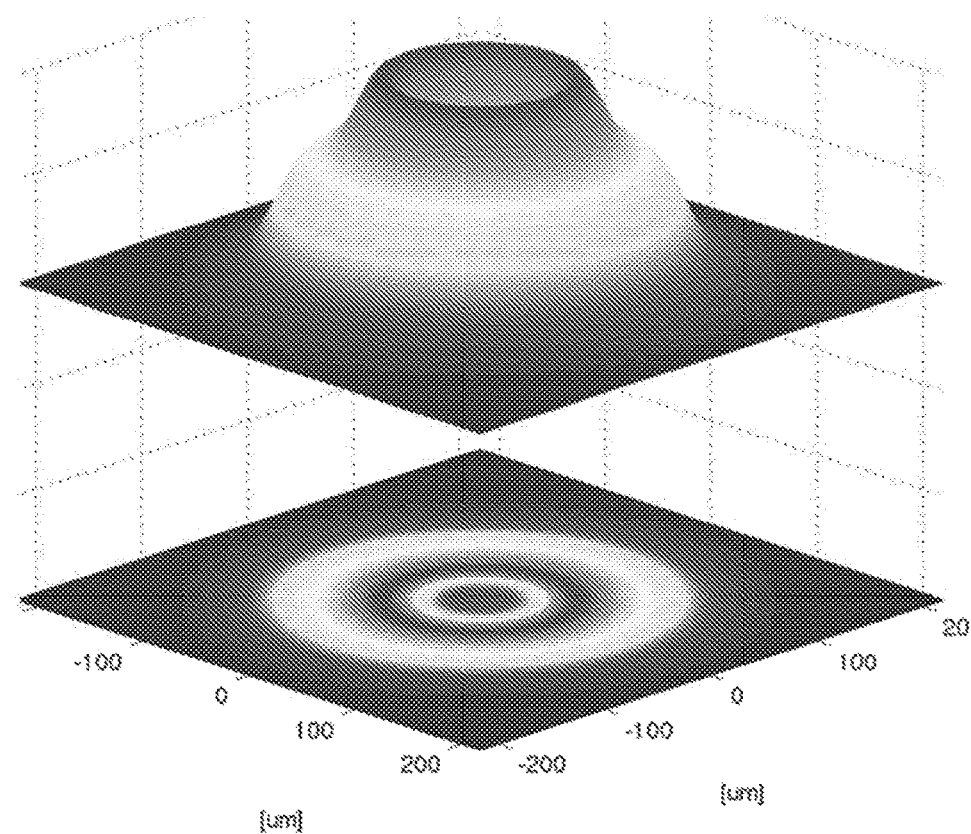
FIG. 11a is a graph showing a transverse power distribution with a real annular profile, respectively by means of a three-dimensional representation of the beam's intensity and a two-dimensional representation of the distribution of the beam's intensity in the transverse focusing plane.
Figure 11B:
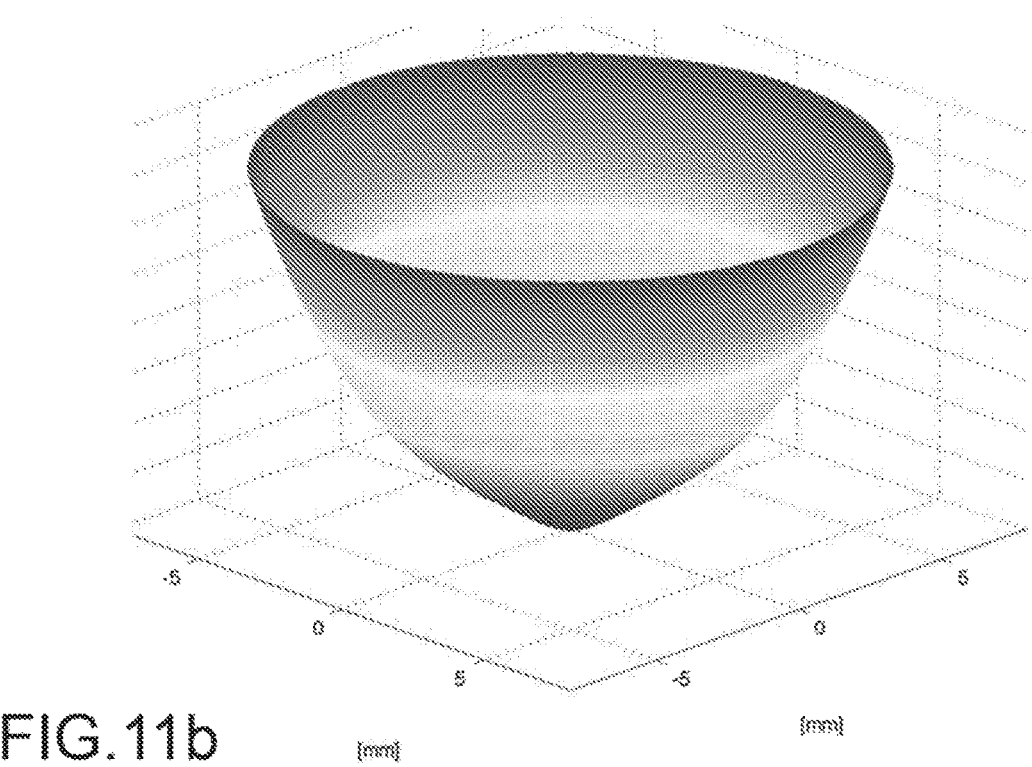
Figure 11C:
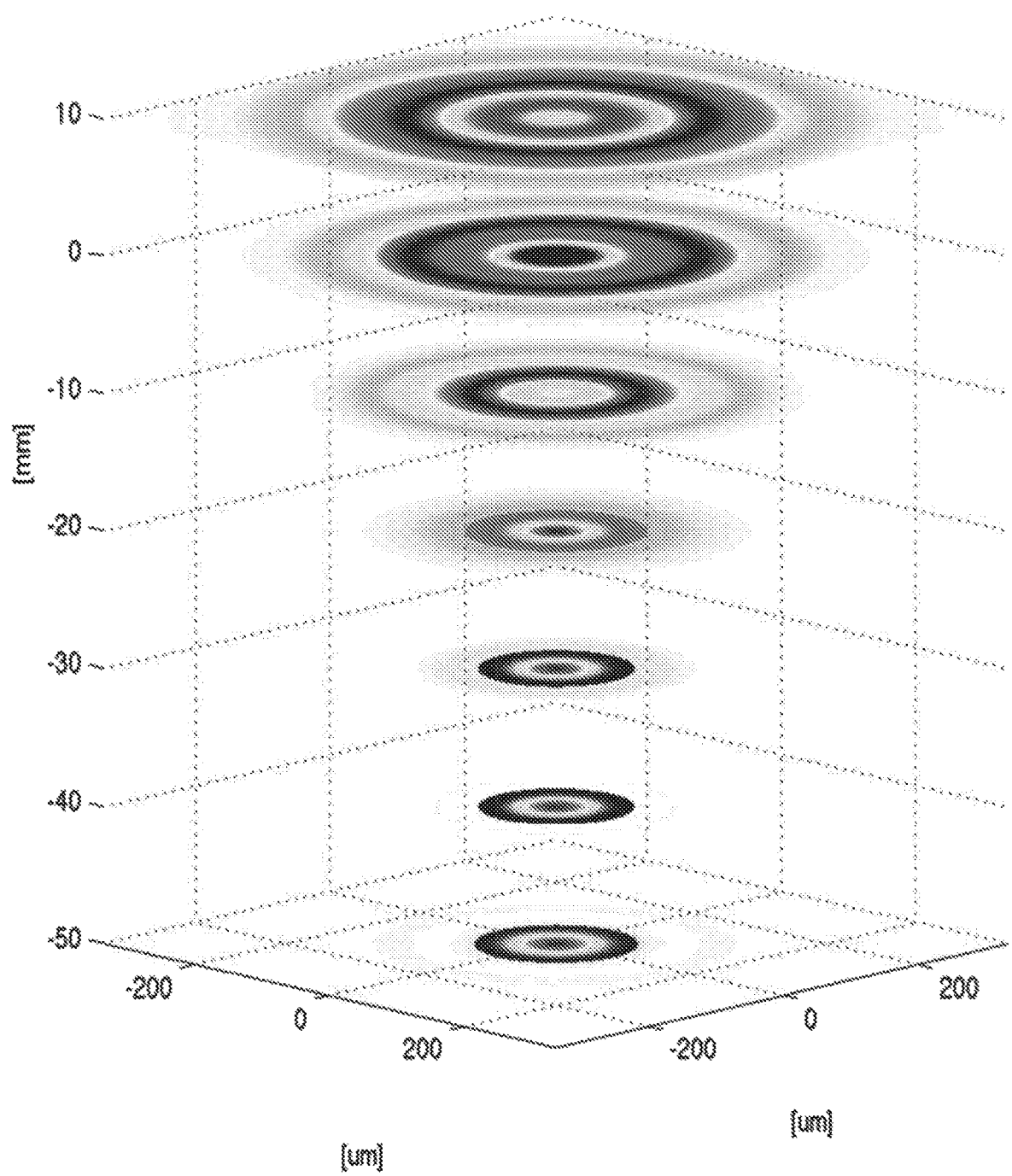
FIG. 11c is a graph showing the evolution of the beam's distribution intensity (in two-dimensional representation) along the propagation direction of the same beam, which has an annular profile at the working plane.

According to a further embodiment of the method of the invention, an arrangement for the reflection areas of the deformable, controlled surface reflecting element is implemented that is adapted to establish a transverse power distribution of the beam in an area of the working plane on the metallic material having an annular profile of predetermined diameter (donut). The annular profile power distribution is shown in FIG. 11a, where the upper graph is a three-dimensional representation of the normalized intensity of the beam and the lower graph is a two-dimensional representation of the beam intensity distribution in the focusing plane for a typical beam having a focusing spot size on the working plane area with a external radius of the order of 180 microns and an internal radius of the order of 40 microns, wherein the power inside the annular profile does not exceed 1% of the overall beam power. The graphs in FIG. 11b show the three-dimensional configuration of the surface of the deformable, controlled surface reflecting element, wherein the axes of the graph are not to scale, the vertical axis being expressed in microns (as opposed to the horizontal axes expressed in millimeters) to allow a better view of the profile. The maximum travel of the movement modules of the movable reflection areas is of the order of 5 microns. In order to achieve an ideal annular profile, it would be necessary to modulate the reflective element to form a cone surface with an angle at the vertex not feasible due to the presence of a central area of the reflecting element with finite dimensions. Consequently, a real annular profile may be achieved by resorting to the definition of a similar surface, but with a beveled profile at the vertex that is physically feasible. In any case, the approximation of the conical surface does not deteriorate excessively the power distribution of the beam in terms of amount of energy dispersed in the center of the spot. The evolution of intensity distribution of the beam along the propagation direction is shown by the graph of FIG. 11c where the change of the power distribution is simulated at different depths from the working plane (indicated by the coordinate 0 along the vertical axis z). In particular, the evolution of power distribution has been simulated at a depth range between 10 millimeters above and 50 millimeters below the working plane, with steps of 10 millimeters.

Figure 12A:
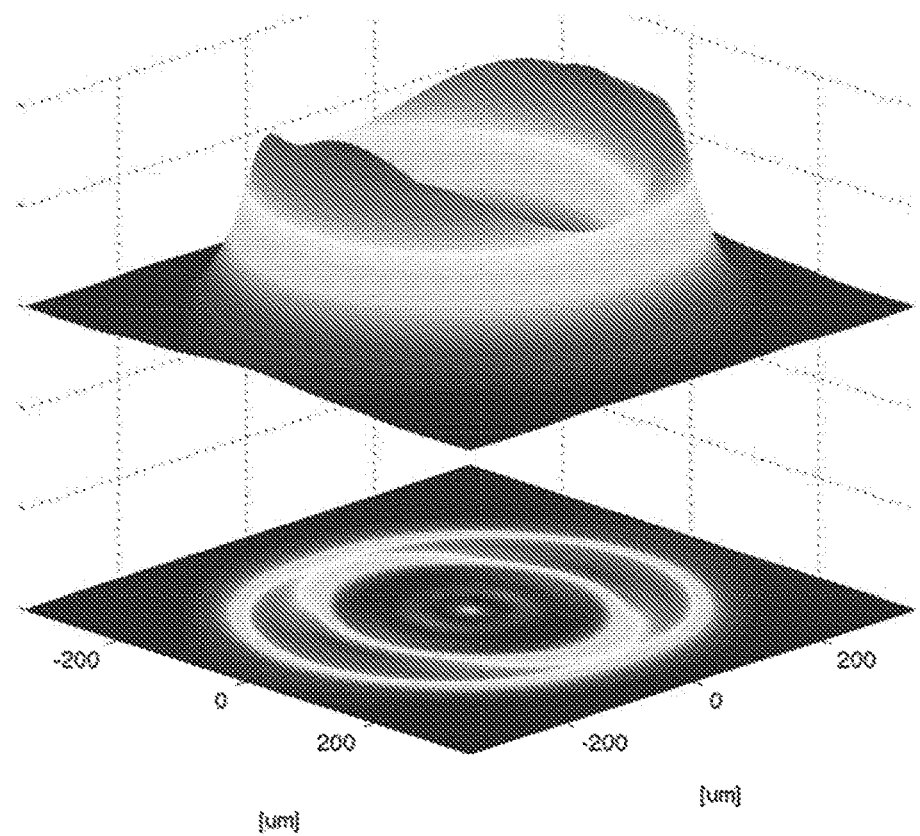
FIG. 12a is a graph showing an annular transverse power distribution obtainable with a reflective element inclined at 45° relative to the direction of incidence of the beam, respectively by means of a three-dimensional representation of the beam's intensity and a two-dimensional representation of the distribution of the beam's intensity in the transverse focusing plane.
Figure 12B:
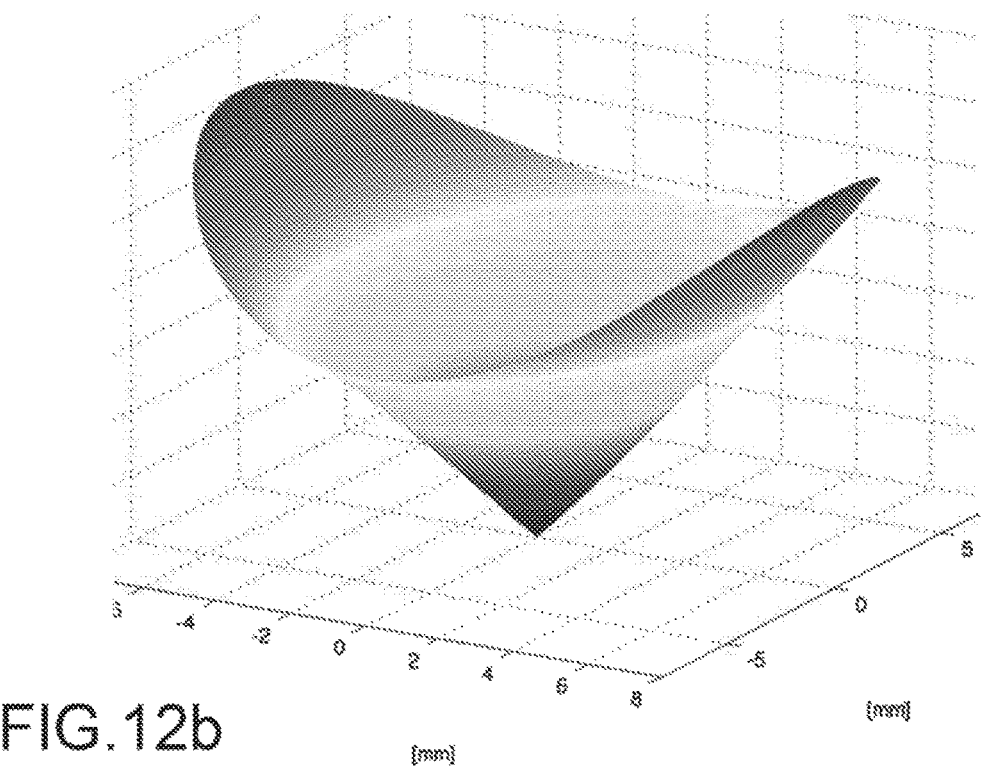

FIGS. 12a and 12b show, respectively, the power distribution with an annular profile (donut) and the three-dimensional configuration of the surface of the deformable reflective element in a condition wherein the reflective element is arranged at 45 degrees relative to the direction of incidence of the collimated beam. The maximum travel of the movement modules of the movable reflection areas is on the order of 6 microns.

Figure 13A:
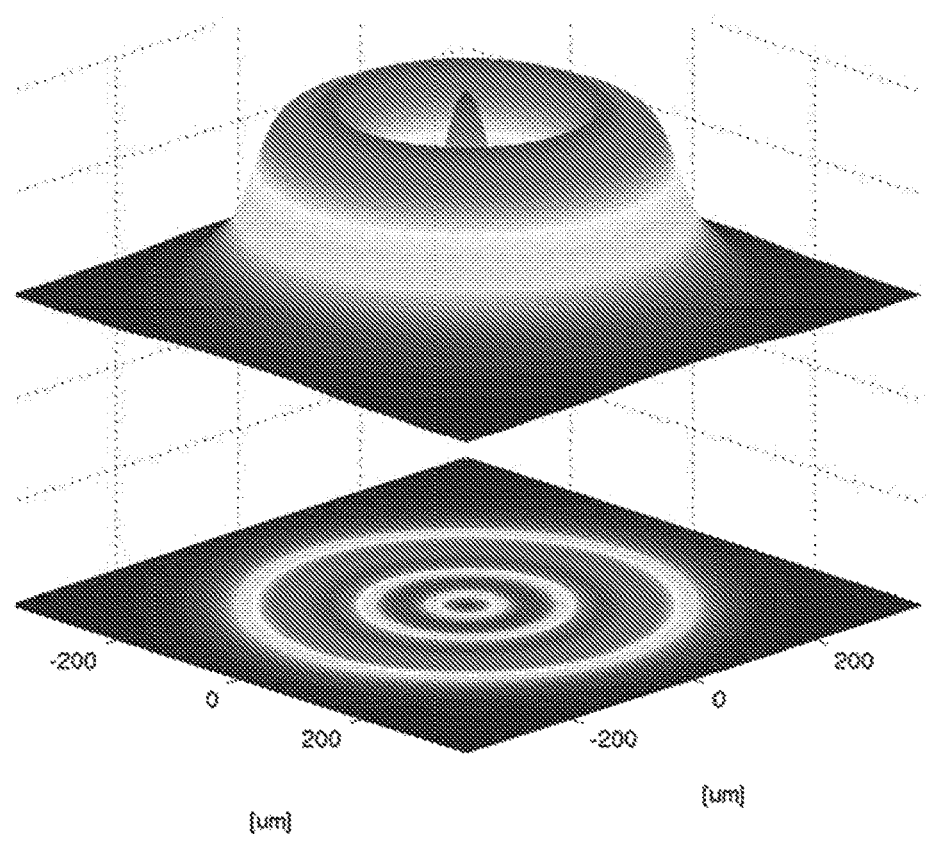
FIG. 13a is a graph showing a transverse power distribution with a circular symmetric profile obtainable by concentric overlapping of a Gaussian distribution and an annular distribution externally concentric to the Gaussian distribution, respectively by means of a three-dimensional representation of the beam's intensity and a two-dimensional representation of the beam's intensity distribution in the transverse focusing plane.
Figure 13B:
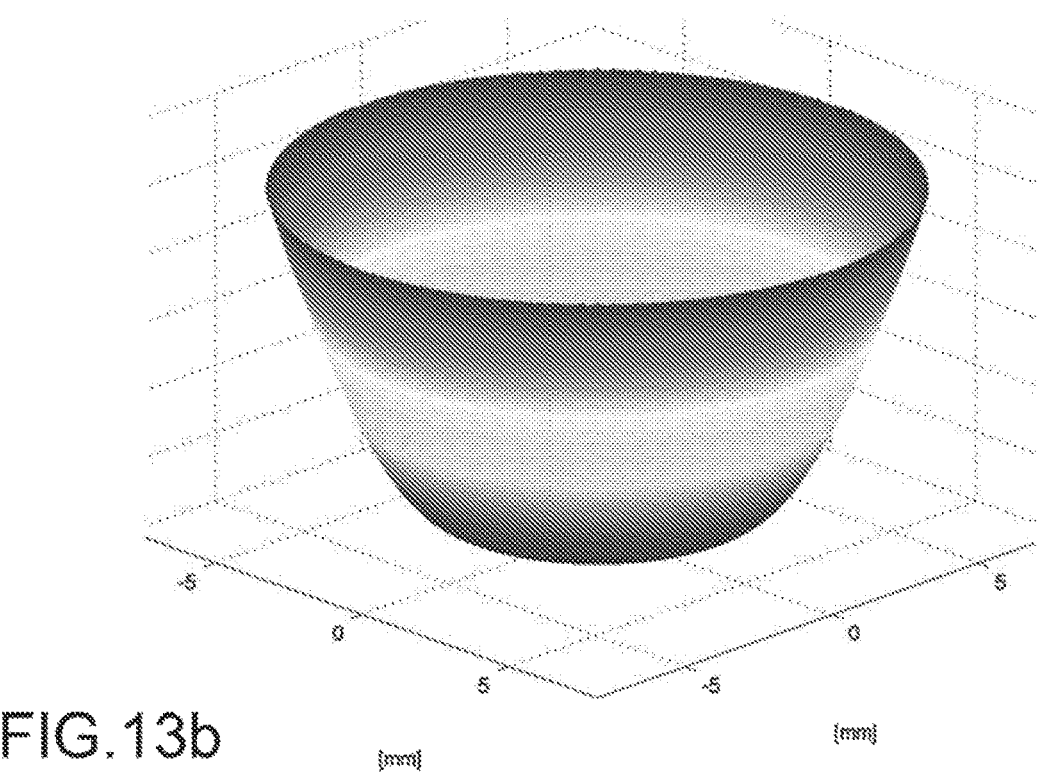
Figure 13C:
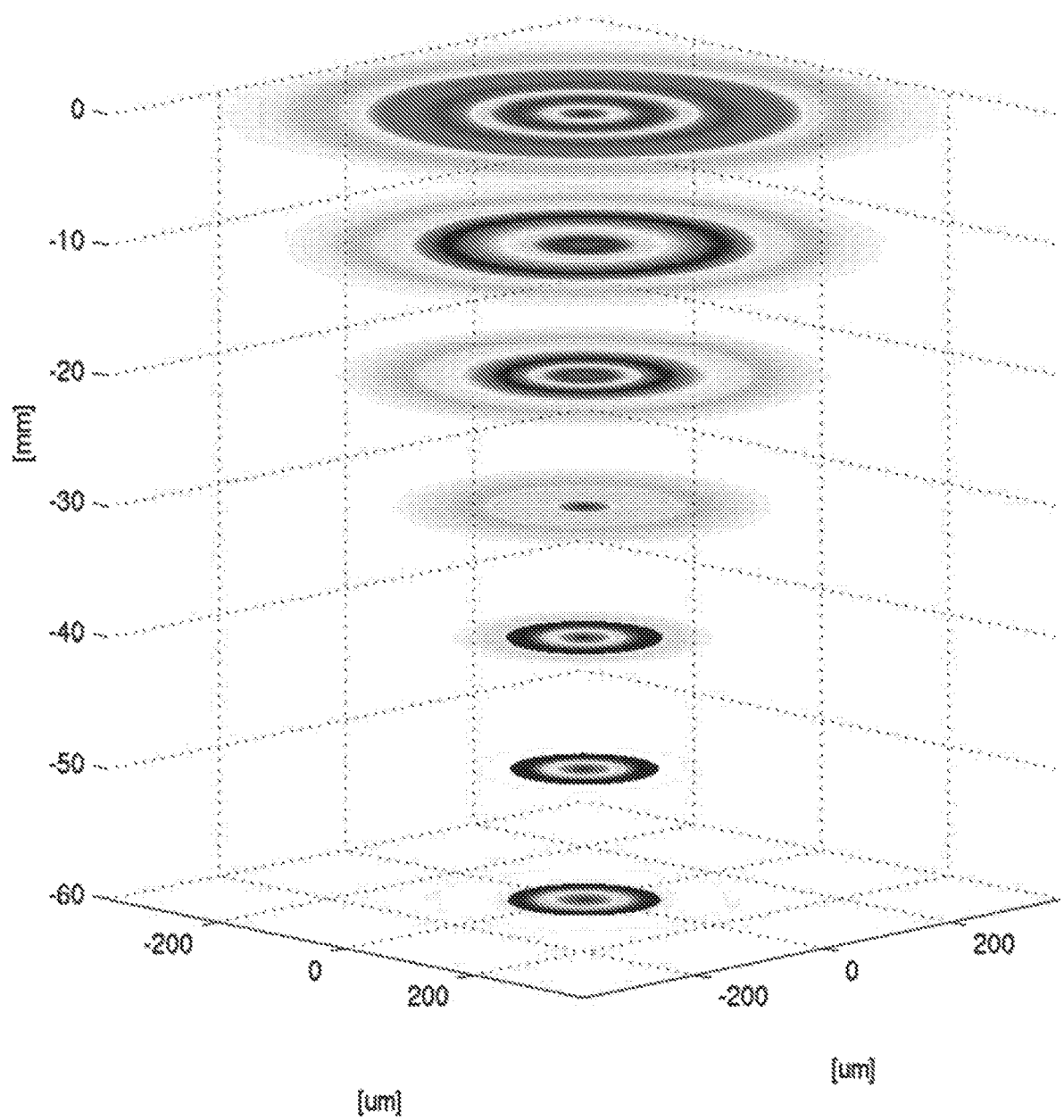
FIG. 13c is a graph showing the evolution of the beam's intensity distribution (in two-dimensional representation) along the direction of propagation of the same beam, which has a profile of the type described in FIG. 13a (also describable as Gaussian-annular) on the working plane.

According to a further embodiment of the method of the invention, an arrangement of the reflection areas of the deformable, controlled surface reflecting element is implemented that is adapted to establish a transverse power distribution of the beam in an area of the working plane on the metallic material having a Gaussian profile of predetermined diameter overlapping an annular profile outside the Gaussian profile. The power distribution according to the aforementioned profile is shown in FIG. 13a, where the upper graph is a three-dimensional representation of the normalized intensity of the beam and the lower graph is a two-dimensional representation of the intensity distribution of the beam in the focusing plane for a typical beam having a focusing spot size on the area of the working plane of the order of 130 microns, wherein the power of the central profile is 25% of the beam's overall power. The graph in FIG. 13b shows the three-dimensional configuration of the surface of the deformable, controlled surface reflecting element, wherein the axes of the graph are not to scale, the vertical axis being expressed in microns (as opposed to the horizontal axes expressed in millimeters) to allow a better view of the profile. The maximum travel of the movement modules of the movable reflection areas is of the order of 5 microns. As a function of the diameter of the central flat area of the reflecting element it is possible to produce different profiles in the allocation of the overall power of the beam between the central profile and the surrounding annular profile. The evolution of intensity distribution of the beam along the propagation direction is shown in the graph in FIG. 13c where the change in power distribution is simulated at different depths from the working plane (indicated by the coordinate 0 along the vertical axis z). In particular, the evolution of the power distribution has been simulated for a depth range between the working plane and 60 millimeters below the working plane, with steps of 10 millimeters.

As is apparent from the graphs shown, for applications linked to the modification of the Gaussian power distribution in order to obtain transverse power distribution with a flat (flat top) or annular (donut) profile, or in Gaussian-annular combination, which retain circular symmetry, the deformable, controlled surface reflecting element 200 may include a plurality of independently movable reflection areas in the form of radially independent circular crowns.

Figure 14A:
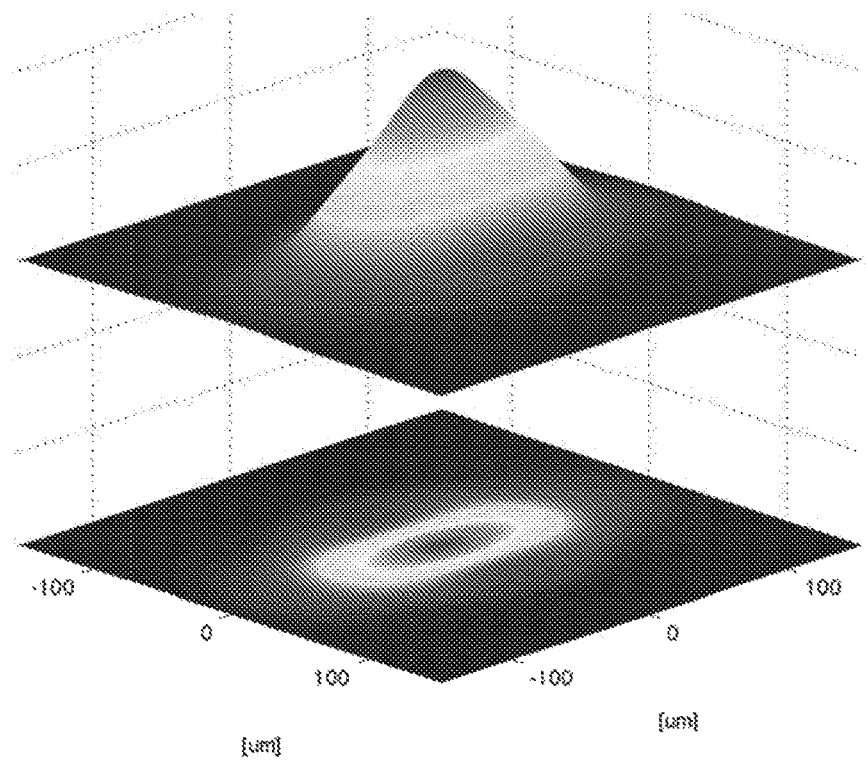
FIG. 14a is a graph showing a transverse power distribution with an elliptical profile, respectively, by means of a three-dimensional representation of the beam's intensity and a two-dimensional representation of the beam's intensity distribution in the transverse focusing plane.
Figure 14B:
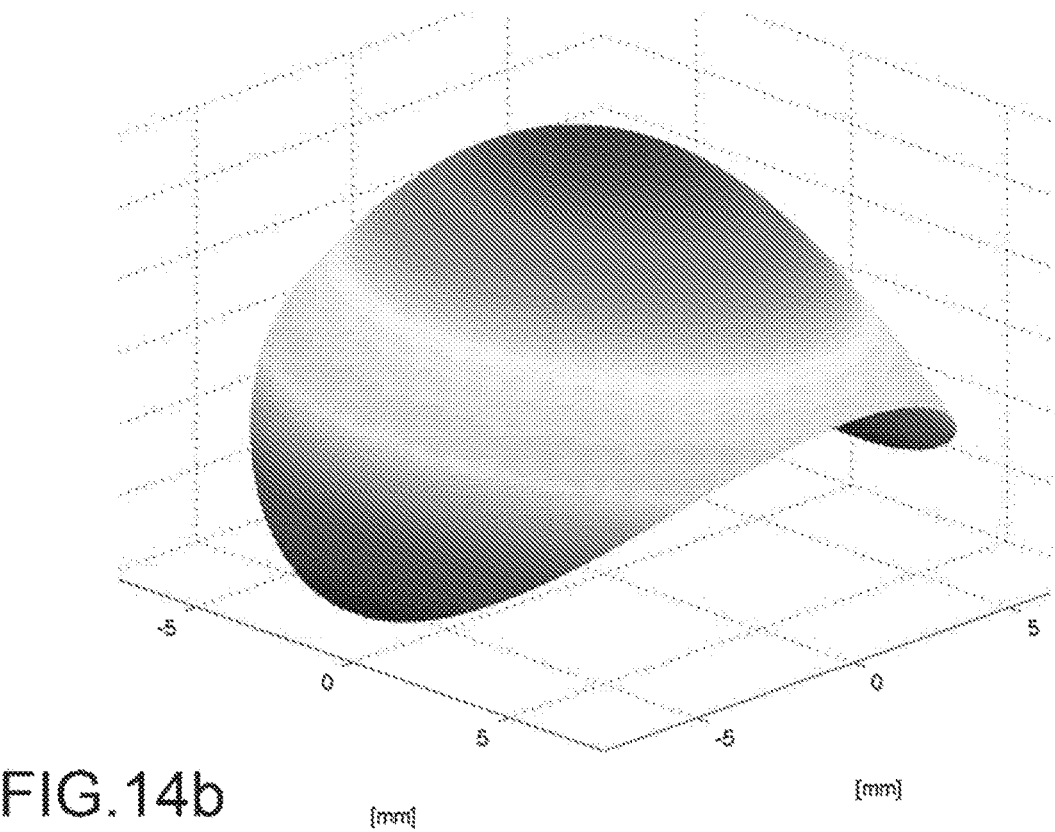
Figure 14C:
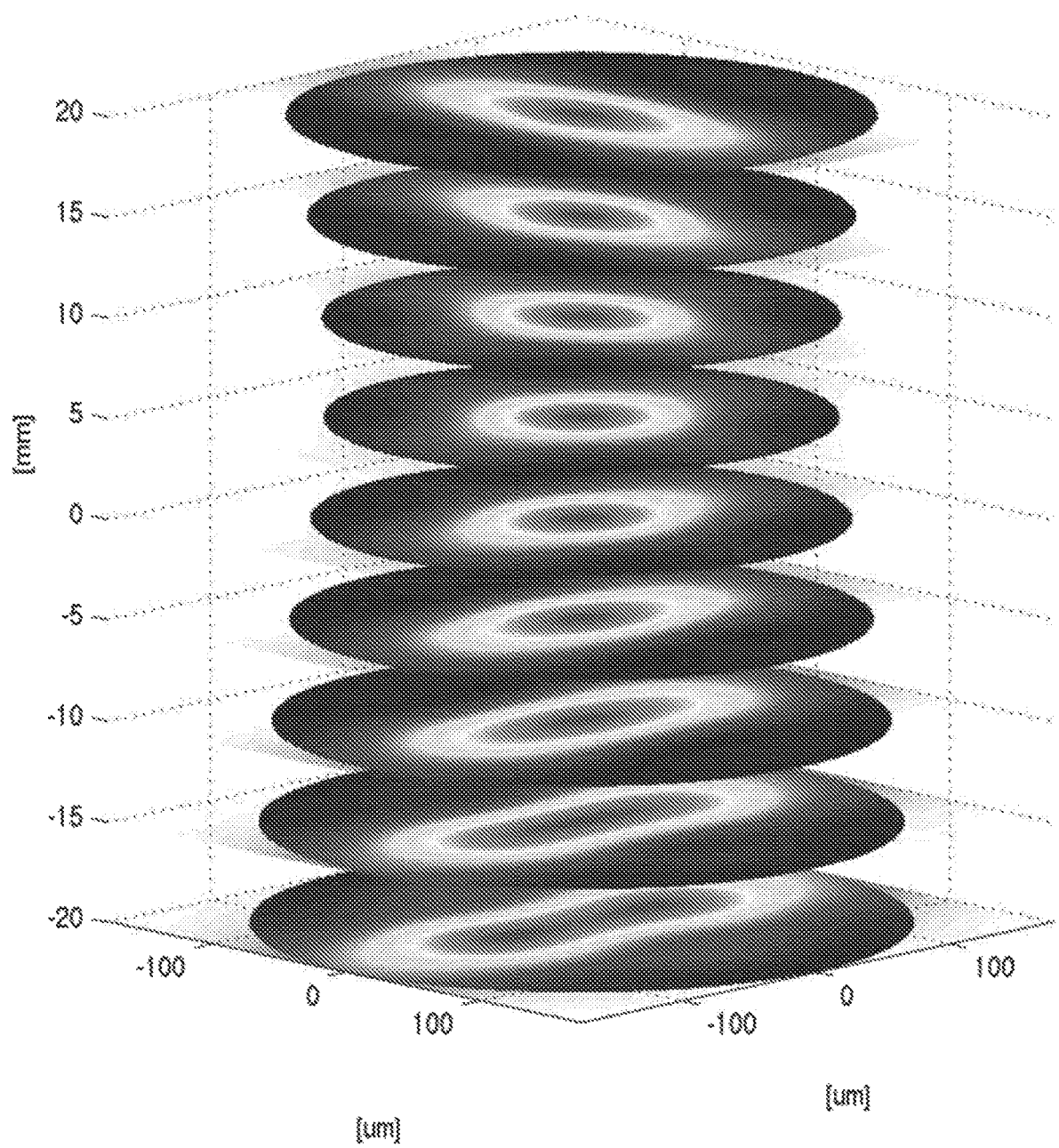
FIG. 14c is a graph showing the evolution of the beam's intensity distribution (in two-dimensional representation) along the propagation direction of the same beam, which has an elliptical profile on the working plane.

According to a further embodiment of the method of the invention, an arrangement of the reflection areas of the deformable, controlled surface reflecting element is implemented that is adapted to establish a transverse power distribution of the beam in an area of the working plane having a Gaussian profile with an elliptical section, preferably having an axis of symmetry in the area of the working plane oriented according to the local direction of the working path, e.g. oriented in the advancing direction of the working path. The power distribution with a Gaussian elliptical profile is shown in FIG. 14a, where the upper graph is a three-dimensional representation of the normalized intensity of the beam and the lower graph is a two-dimensional representation of the intensity distribution of the beam in the focusing plane for a typical beam (single-mode) having axes of the focusing spot on the area of the working plane of the order of 50 microns and 85 microns, respectively. The graph of FIG. 14b shows the three-dimensional configuration of the surface of the deformable, controlled surface reflecting element, wherein the axes of the graph are not to scale, the vertical axis being expressed in microns (as opposed to the horizontal axes expressed in millimeters), to allow a better view of the profile. The maximum travel of the movement modules of the movable reflection areas is of the order of 10 microns. The evolution of the intensity distribution of the beam along the propagation direction is shown in the graph of FIG. 14c, where the change in power distribution is simulated at different depths from the working plane (indicated by the coordinate 0 along the vertical axis z). In particular, the evolution of power distribution was simulated at a depth range between 20 millimeters over and 20 millimeters under the working plane, with steps of 5 millimeters.

Figure 15A:
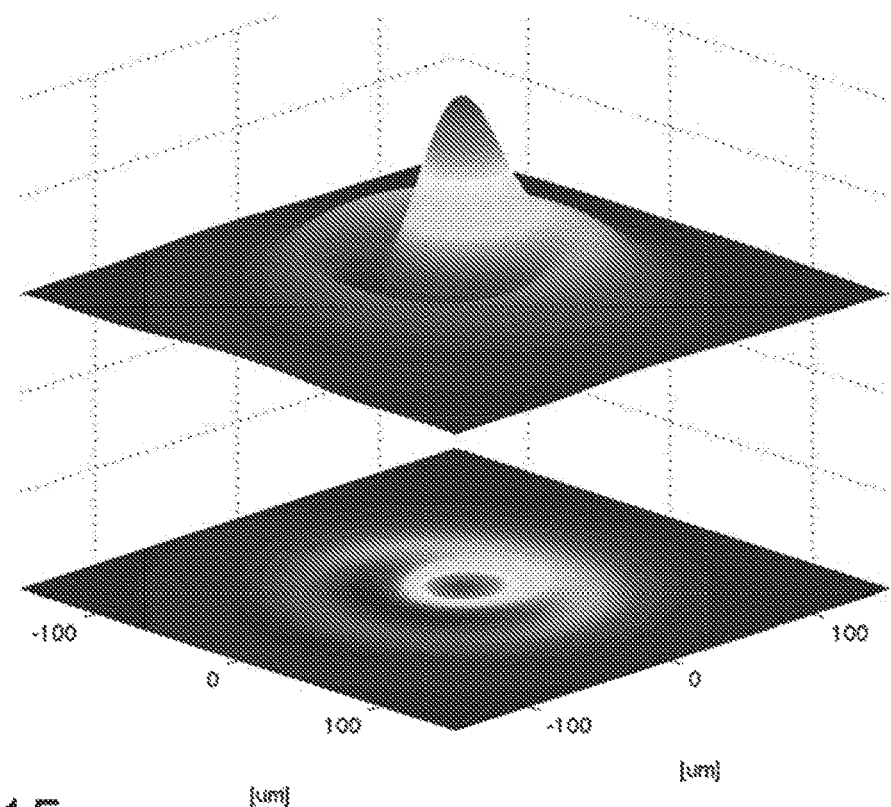
FIG. 15a is a graph showing a transverse power distribution as described by Olsen, respectively by means of a three-dimensional representation of the beam's intensity and a two-dimensional representation of the beam's intensity distribution in the transverse focusing plane.
Figure 15B:
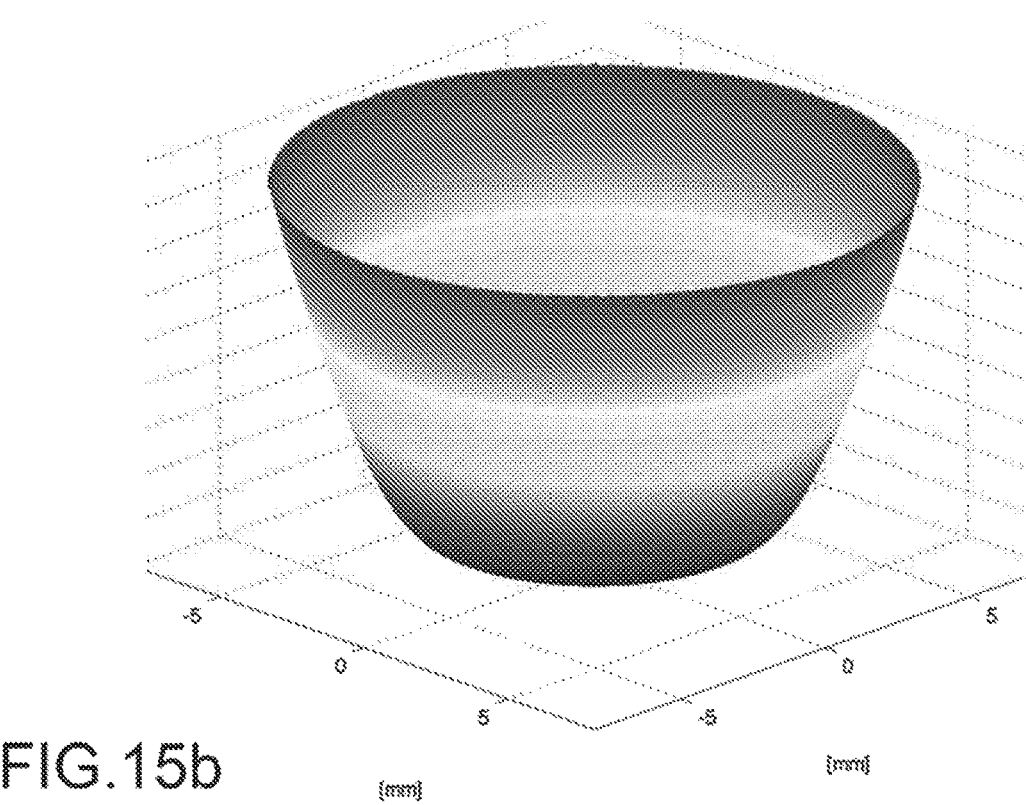
Figure 15C:
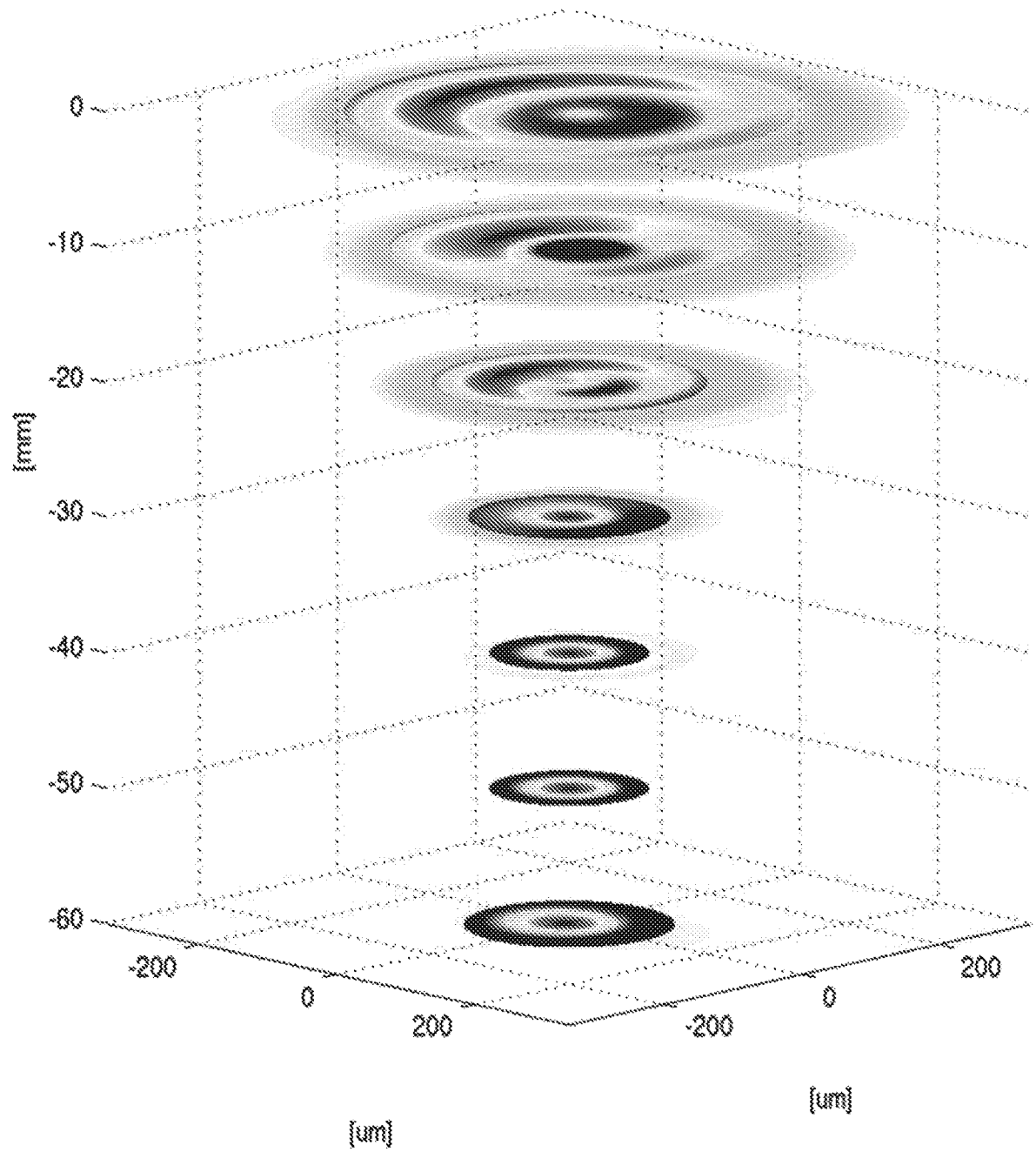
FIG. 15c is a graph showing the evolution of the beam's intensity distribution (in two-dimensional representation) along the propagation direction of the same beam, which has a profile as described by Olsen on the working plane.

According to a further embodiment of the method of the invention, an arrangement of the reflection areas of the deformable, controlled surface reflecting element is implemented that is adapted to establish a transverse power distribution of the beam in an area of the working plane on the metallic material having a profile such as that described by Olsen, i.e. an asymmetrical complex profile comprising a distribution of peak primary power with Gaussian form and a crescent-shaped secondary power distribution posterior to the primary power distribution, preferably having a symmetry axis in the area of the working plane and oriented according to the local direction of the working path, e.g. oriented in the advancing direction of the working path. The power distribution according to the aforementioned profile is shown in FIG. 15a, where the upper graph is a three-dimensional representation of the normalized intensity of the beam and the lower graph is a two-dimensional representation of the intensity distribution of the beam in the focusing plane, for a beam typically having a focusing spot size on the area of the working plane of the order of 120 microns, wherein the power of the primary profile is of the order of 30% of the beam's overall power. The graph in FIG. 15b shows the three-dimensional configuration of the surface of the deformable, controlled surface reflecting element, wherein the axes of the graph are not to scale, the vertical axis being expressed in microns (as opposed to the horizontal axes expressed in millimeters) to allow a better view of the profile. The maximum travel of the movement modules of the movable reflection areas is of the order of 4 microns. The reflective element is deformed by an arrangement of the reflection areas that is non-radially symmetrical: it is possible to describe such an arrangement as the overlap between a deformation generating a donut-gaussian-type distribution and an arrangement that reconstructs an inclined plane with respect to the reference one. Depending on the size of the break in symmetry of the distribution of reflection areas, it is possible to produce different profiles in the allocation of the overall power of the beam between the primary central profile and the surrounding secondary profile. The evolution of the intensity distribution of the beam along the direction of propagation is shown in FIG. 15c graph where the change in power distribution is simulated at different depths from the working plane (indicated by the coordinate 0 along the vertical axis z). In particular, the evolution of the power distribution was simulated in a depth range between the working plane and 60 millimeters below the working plane, with steps of 10 millimeters.

As can be seen in FIG. 15c, the power distribution as described by Olsen is characterized by the possibility of simultaneously performing and controlling a Gaussian primary power distribution and a crescent-shaped secondary power distribution, the allocation of which is a function of the propagation along the optical axis of the beam, i.e., the depth of the working plane. This advantageously allows for a real-time control of the three-dimensionality of processing on the material, for example by generating a power distribution wherein the primary Gaussian power distribution is prevalent on a working plane on the surface of the material where illumination is required, and therefore heating, of the advancing front in the groove, and the crescent-shaped secondary power distribution is prevalent in a working plane within the volume of the material where it is required to illuminate the tail of molten material deep in the material and coming out of the same groove, and which may adhere to the walls of the same groove due to the progressive cooling resulting from the lack of illumination by the laser beam, in the Gaussian case.

Figure 16:
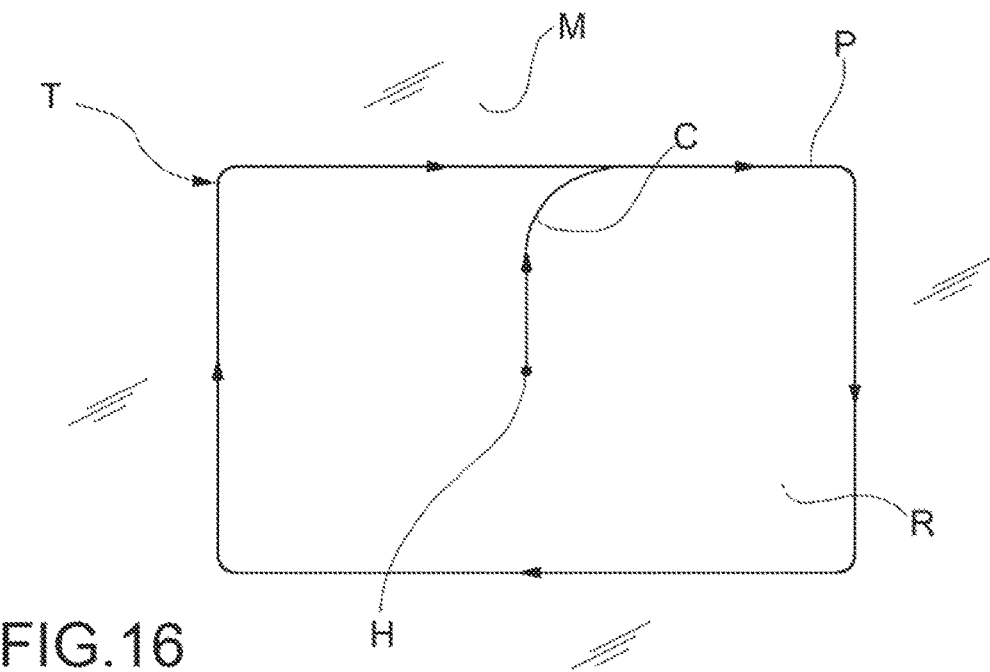
FIGS. 16 and 17 are schematic representations of processing examples according to the method of the present invention.

An example of processing according to the method of the present invention is shown in FIG. 16, and in particular a cutting operation of a rectangular recess R in a material M.

In the figure, a programmed working path is indicated at T. The working path includes a drilling area H, an approach or connection profile C and a cutting profile P comprising, by way of example, a succession of straight sections and curved connecting sections forming a closed line.

A laser cutting machine is programmed to perform uninterrupted processing by varying the power distribution of the laser beam incident on the material according to the current processing phase.

The actuation of the arrangement of reflection areas of the laser beam shaping means is controlled to establish a first transverse power distribution of the beam of the Gaussian type with the smallest focusing spot possible at the drilling area H, to establish a second transverse power distribution from the wider Gaussian type to flat top and then donut, so as to widen the drilling for extrusion of the molten material while simultaneously allowing an easy flow of material and appropriate wavefront illumination, when, the drilling being complete, the beam begins to go through the approach or connection profile A. A third transverse power distribution of the beam of the asymmetrical type obtained by the Gaussian-crescent-shaped combination is used at the cutting profile C, oriented according to the local direction of the working path in the succession of straight sections and curved sections of the cutting profile. At any sharp edge path modifications, hence at local stops of the movement, the transverse power distribution also takes into account the speed value, facilitating the direction change of the expulsion of molten material and of the assist gas, for example through an elliptical power distribution.

Figure 17:
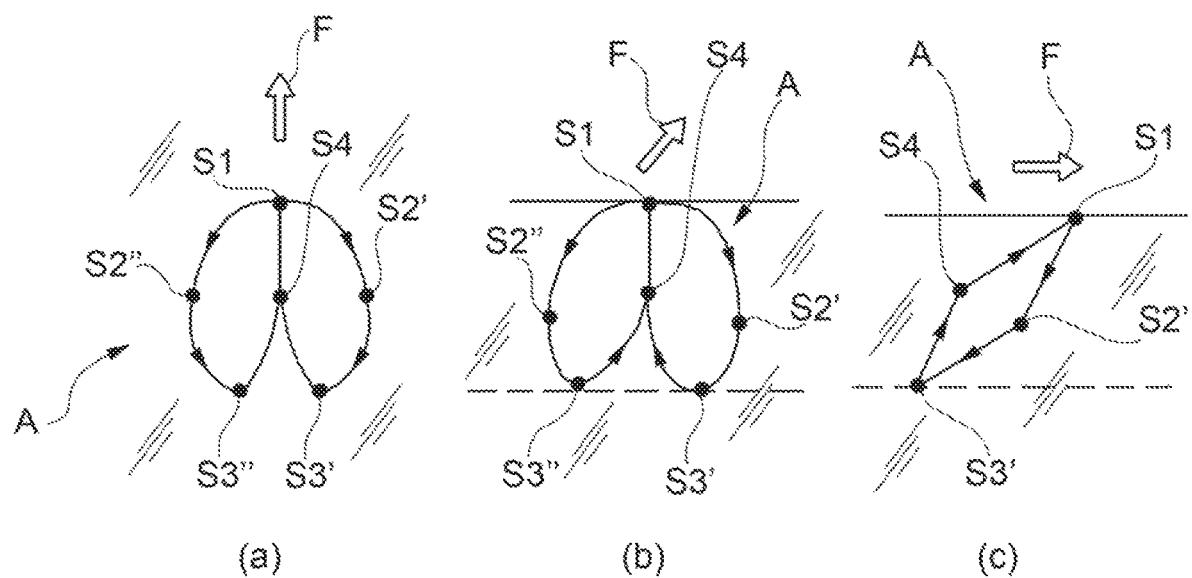

FIG. 17 shows an example of processing according to the method of the present invention, and in particular a time succession of the evolution of the power distribution applicable during a cutting process performed along a predetermined path not shown as a whole, but whose direction and sense of travel are indicated in the figure with the arrow F.

A laser cutting machine is programmed to perform the work without interruption by varying the power distribution of the laser beam incident on the material over time and cyclically according to a law described below with reference to the views of FIGS. 17a, 17b and 17c, where there are shown respectively, a top, rear, and side view of a processing area A that moves continuously along the predetermined path following the relative movement between the working head and the material.

S1, . . . , S4 indicate the spots of incidence of the laser beam on the material being processed, circumscribed around the positions of the optical axis of the laser beam and included in a delivering zone of the assist gas flow on the working material which is common to the entire working area A. It should be noted that, typically, for cutting and/or drilling operations on carbon steel with thicknesses of 4 mm to 30 mm, stainless steel with thicknesses of 4 mm to 25 mm, aluminum alloys with thicknesses of 4 mm to 15 mm, and copper and brass with thicknesses of 4 mm to 12 mm, the typical size of the delivering zone of the assist gas flow ranges from 1.8 mm to 4 mm.

Figure 18:
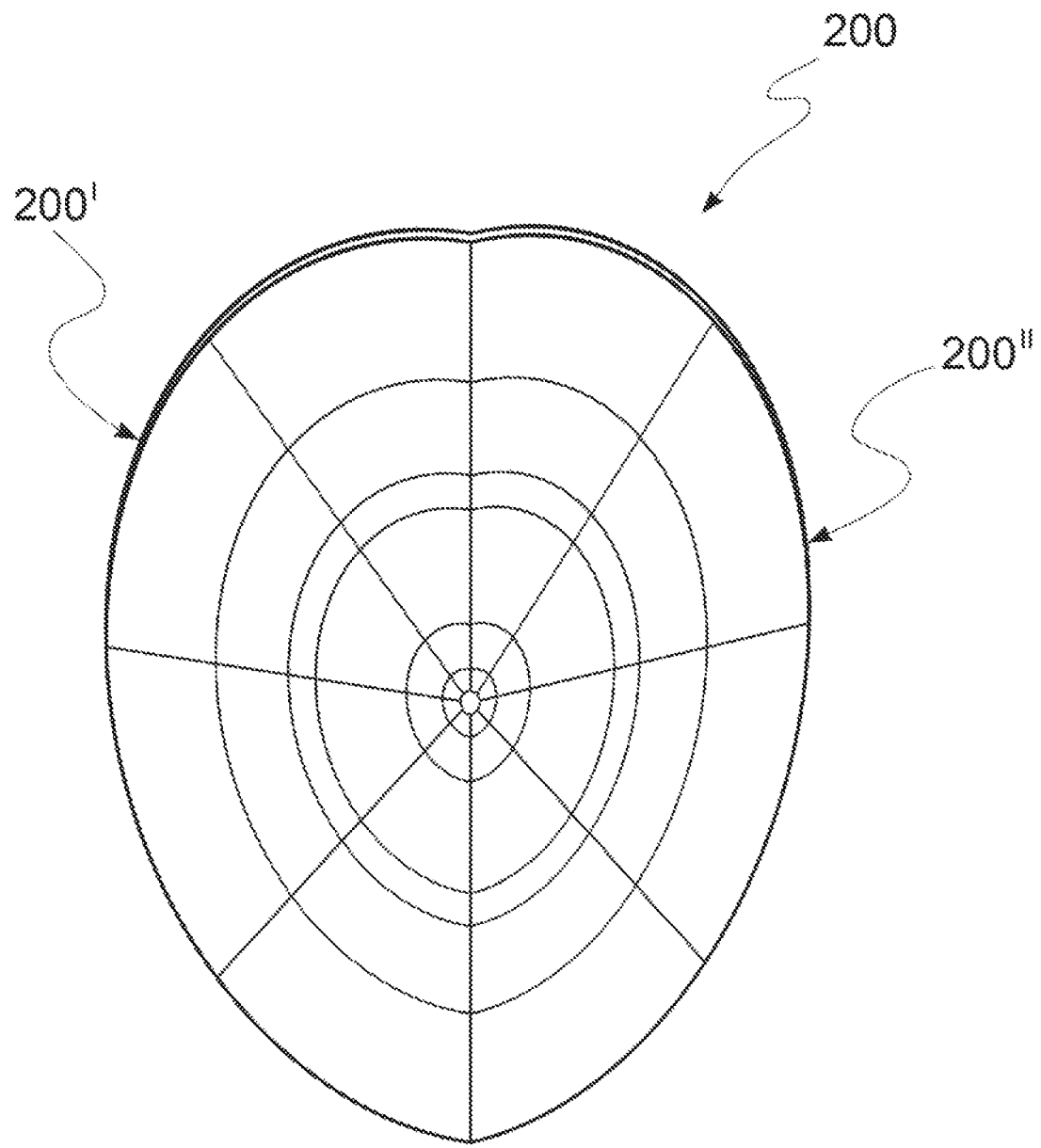
FIG. 18 is an exemplary embodiment of a controlled surface reflecting element for the shaping of the optical beam.

The controlled power distribution in the working area A is obtained by the combination of two separate Gaussian beams, aligned transversely with respect to the direction of the working path and therefore may be described as a transverse electromagnetic mode TEM10. This distribution is obtainable by dividing the reflector element 200 of the laser beam shaping means into two semi-elements 200', 200" joined along an axis (diameter) of the reflecting element and by means of the central area and orientable so as to form a concave dihedral angle (of the order of 0.1-0.3 degrees) facing the propagation space of the laser beam, as shown in FIG. 18. It shall be understood that the junction diameter of the two semi-elements of the reflecting element may be any of the diameters identified by the arrangement of the movement modules. Each reflecting semi-element 200', 200" is adapted to generate a Gaussian transverse power distribution (by separating the original beam), and the respective movement modules are controlled in such a way as to make predetermined general inclination movements of the semi-element as a whole, relative to their respective rest states, preferably synchronously with each other and mirroring each other, which determine the spatial displacement of the laser beam spot on the working material.

The relative position of the respective optical propagation axis of the two Gaussian beams varies over time according to the spatial law shown in the figures. The movement of the two beams in the working area occurs in synchrony according to the local direction of the working path and in a succession of working planes. It may be described, with reference to FIGS. 17a, 17b and 17c, by combining the following movements:

1) The barycenter of the overall power distribution advances over time according to the local direction of the working path F, and coincides with the delivery axis of the assist gas flow or is at a distance from the delivery axis of the assist gas flow not exceeding half the radius of the nozzle mouth, in a position ahead of the advancing direction of the working path.

2) In projection on the horizontal plane of FIG. 17a, the optical axis of each of the two Gaussian beams moves locally according to an elliptical trajectory around a respective predetermined geometric barycenter of time revolution, respectively clockwise at the right of the barycenter of the overall power distribution with respect to the advancing direction of the process, and counterclockwise at the left of the barycenter of the overall power distribution with respect to the advancing direction of the process, at a distance from the respective barycenter of revolution between 0.3 times and 2 times the radius of the focusing spot of the single beam at the waist.

3) During the time revolution movement around the respective predetermined barycenter, the location of the focusing plane of each of the two Gaussian beams along the respective optical propagation axis varies in depth in the thickness of the material, with a retrograde evolution according to a parallelogram path in the sagittal plane projection of FIG. 17c, which determines the evolution of the optical axis of each of the two Gaussian beams in the frontal plane projection shown in FIG. 17b.

4) The barycenters of revolution of the optical axis of each of the two Gaussian beams advances over time according to directions parallel to the direction of movement of the barycenter of the overall power distribution, respectively to the right and to the left of it, determining, in the projection on the front plane and on the sagittal plane, an overall evolution according to a sinusoidal pattern.

The movements described in previous steps 1-4 are represented in the figure by the oriented lines. S1 indicates the focusing spot of each Gaussian beam on the surface of the material in the locally more advanced position according to the working path F. ST and ST' indicate the separate focusing spots of the Gaussian beams at a first intermediate depth in the volume of material and in a first intermediate position retracted compared to the position S1 with respect to the working path F during the revolution movement around a respective predetermined geometric barycenter of time revolution. S3' and S3" indicate separate focusing spots of the Gaussian beams at a maximum depth in the material volume and in a second intermediate retracted position compared to the position S1 and further retracted compared to positions ST and ST' with respect to the working path F, during the revolution movement around the respective predetermined geometric barycenter of time revolution. Finally, S4 indicates the focusing spot of each Gaussian beam at a second intermediate depth in the material volume and in a third intermediate retracted position compared to the position S1 with respect to the working path F during the revolution movement around the respective predetermined geometric barycenter of time revolution.

Such processing is carried out, for example, for cutting a 10 mm thick steel plate in a nitrogen atmosphere with a typical feed speed along a predetermined working path of between 1000 and 2000 mm/min. A cyclic control frequency of the beam power distribution of at least 500 Hz and preferably of 1 kHz, or more generally which is an integer multiple of v/2D, where v is the advancing speed of the barycenter of the overall power distribution, expressed in microns/second, and D is the diameter of the laser beam focusing spot at the waist, expressed in microns, allows a structured apparent interaction volume created by the fast local displacement of the Gaussian beam pair to be obtained. The two beams meet on the surface of the material in the position S1 to provide maximum amount of energy to the front edge of the cut, then descend in depth and on the tails of the material to be expelled to keep it fluid. Advantageously, this processing method allows in principle to maintain or increase the cutting effort on the advancing front, to increase the self-expelling force of the material itself, resulting in a reduction in the need for assist gas.

It is understood that what is referred in the preceding exemplary embodiment to Gaussian power distributions may extend to other types of power distribution of the laser beam generated by each semi-element, the same or different from each other, and other movements, mirrored or not, of each beam.

Naturally, without altering the principle of the invention, the embodiments and the details of implementation may vary widely with respect to that which is described and illustrated purely by way of non-limiting example, without thereby departing from the scope of protection of the invention defined by the appended claims.

The invention claimed is:

1. A method of laser processing of a metallic material, in particular for laser cutting, drilling or welding of said material, by a focused laser beam having a predetermined transverse power distribution at a working plane of the metallic material, the method comprising the steps of:
    providing a laser beam emitting source;
    leading the laser beam emitted by said emitting source along a beam transport optical path to a working head arranged adjacent to the metallic material;
    collimating the laser beam along an optical axis of propagation incident on the metallic material;
    focusing said collimated laser beam in an area of the working plane of said metallic material;
    conducting said focused laser beam along a working path on the metallic material comprising a succession of working areas;
    shaping the laser beam, wherein the shaping of the laser beam comprises: reflecting said collimated laser beam by a deformable controlled surface reflecting element having a reflecting surface with a continuous curvature including a plurality of independently movable reflection areas;
    controlling an arrangement of said plurality of independently movable reflection areas to establish the predetermined transverse power distribution of the focused laser beam at the working plane of the metallic material based on the area of the working plane of the metallic material or a current direction of the working path on the metallic material;
    delivering a flow of assist gas towards said area of the working plane of the metallic material along an axis of the assist gas flow;
    translating the axis of the assist gas flow relatively to a predetermined working path on the metallic material;
    detecting a current position or a direction of the current translation of the axis of the assist gas flow;
    automatically controlling the transverse power distribution of the laser beam based on the detected current position or the detected direction of the current translation of the axis of the assist gas flow by controlling the arrangement of said reflection areas to establish said predetermined transverse power distribution of the focused laser beam in an area of the working plane on the metallic material, wherein said area of the working plane is comprised in a predetermined neighborhood around the axis of the assist gas flow and within a delivering area of said assist gas flow.

2. The method according to 1, wherein the automatic control of the transverse power distribution of the laser beam based on the current position or of the detected direction of the current translation of the axis of the assist gas flow is performed according to a predetermined control pattern or program.

3. The method according to claim 1, wherein the step of controlling the arrangement of said reflection areas comprises establishing a transverse power distribution of the beam in an area of at least one working plane on the metallic material having a Gaussian form with a predetermined diameter.

4. The method according to claim 1, wherein the step of controlling the arrangement of said reflection areas comprises establishing a transverse power distribution of the beam in an area of at least one working plane on the metallic material having an annular shape.

5. The method according to claim 1, wherein the step of controlling the arrangement of said reflection areas comprises establishing a transverse power distribution of the beam in an area of at least one working plane on the metallic material having a flat profile shape with a predetermined diameter.

6. The method according to claim 1, wherein the step of controlling the arrangement of said reflection areas comprises establishing a transverse power distribution of the beam in an area of at least one working plane on the metallic material including a Gaussian distribution with a predetermined diameter and an annular distribution externally concentric to the Gaussian distribution.

7. The method according to claim 1, wherein the step of controlling the arrangement of said reflection areas comprises establishing a transverse power distribution of the beam in an area of at least one working plane on the metallic material including a Gaussian distribution with a predetermined diameter and a semi-annular distribution externally concentric to the Gaussian distribution.

8. The method according to claim 7, comprising an orientation of the axis of symmetry of said transverse power distribution of the beam including a Gaussian distribution with a predetermined diameter and a semi-annular distribution externally concentric to the Gaussian distribution in the area of the working plane, depending on a local direction of the working path.

9. The method according to claim 1, wherein the step of controlling the arrangement of said reflection areas in order comprises establishing a transverse power distribution of the beam in an area of at least one working plane on the metallic material having a Gaussian form with an elliptical section.

10. The method according to claim 9, comprising an orientation of the axis of symmetry of said transverse power distribution of the beam having a Gaussian form with an elliptical section in the area of the working plane, depending on a local direction of the working path.

11. The method according to claim 1, comprising the relative translation of the axis of the assist gas flow along a predetermined working path on the metallic material, the detection of the current position or the detection of the current direction of translation of the axis of the assist gas flow, and the automatic adjustment of a position of the optical axis of propagation of the laser beam based on the detected current position or the detected current direction of translation of the axis of the assist gas flow.

12. The method according to claim 11, wherein the automatic adjustment of the position of the optical axis of propagation of the laser beam based on the detected current position or the detected current direction of translation of the axis of the assist gas flow is performed according to a predetermined adjustment pattern or program.

13. The method according to claim 12, wherein the step of controlling the arrangement of said reflection areas comprises establishing an overall transverse power distribution of the beam in an area of at least one working plane on the metallic material corresponding to a TEM10 transverse electromagnetic mode, including a combination of two Gaussian distributions with a predetermined diameter transversely aligned with respect to the direction of the working path, wherein the relative position of the optical propagation axis and the focusing plan of said two Gaussian distributions varies cyclically over time depending on the local direction of the working path according to a law which includes the combination of the following movements:
- advancement of the barycenter of the overall power distribution along the local direction of the working path;
- when projected onto a horizontal plan, movement of the optical axis of each of said two Gaussian distributions according to an elliptical revolving trajectory around a respective predetermined time revolution geometric barycenter, respectively clockwise at the right of the barycenter of the overall power distribution with respect to the progressing direction of working, and counter-clockwise at the left of the barycenter of the overall power distribution with respect to the progressing direction of working;
- during the time revolution movement around the respective predetermined barycenter, varying the location of the focusing plane of each of said two Gaussian distributions along the respective optical axis of propagation, with retrograde evolution along a parallelogram trajectory in projection on a sagittal plan;
- progressing of the barycenters of revolution of the optical axis of each of said two Gaussian distributions along directions which are parallel to the direction of movement of the barycenter of the overall power distribution, respectively to the right and to the left thereof.

14. The method according to claim 13, wherein a cyclic variation of the relative position of the optical axis of propagation of each of said two Gaussian distributions and of the location of the focusing plane of each of said two Gaussian distributions along its respective optical axis of propagation occurs with a frequency that is an integer multiple of v/2D, where v is the progressing speed of the barycenter of the overall power distribution and D is the diameter of the focusing spot of the laser beam in the waist.

15. The method according to claim 1, wherein the controlling of the arrangement of said reflection areas of the controlled surface reflecting element comprises controlling a combination of moves of said areas with respect to a reflecting reference flat surface.

16. The method according to claim 15, wherein the controlling the combination of moves of said reflection areas of the controlled surface reflecting element comprises controlling a translation movement of said areas along the optical axis of the reflecting element or the rotation of said areas to obtain an inclination with respect to the optical axis of the reflecting element.

17. The method according claim 1, comprising providing the deformable controlled surface reflecting element by a corresponding plurality of movement modules which include a central area and a plurality of ranks of circular crown sectors concentric to said central area.

18. The method according to claim 17, wherein said plurality of ranks of concentric circular crown sectors are in number of 6, the circular crown sectors are in number of 8 for each rank, and the height of circular crown sectors is increasing from the first to the third rank and from the fourth to the sixth rank in the radial direction towards the outside of the reflecting element, the height of circular crown sectors of the fourth rank being intermediate between the height of the circular crown sectors of the first and second rank.

19. A computer program comprising one or more code modules for performing a method of shaping a laser beam in a machine for laser processing of a metallic material, in accordance with the method of laser processing according to claim 1, when the program is executed by electronic processing and control means of said machine.

20. A machine for laser processing of a metallic material by a focused laser beam having a predetermined transverse power distribution at a working plane of the metallic material, comprising:
- a laser beam emitting source;
- means for leading the laser beam emitted by said emitting source along a beam transport optical path to a working head arranged adjacent to the metallic material;
- optical means for collimating the laser beam along an optical axis of propagation incident on the metallic material;
- optical means for focusing said collimated laser beam in an area of the working plane of said metallic material, wherein at least said focusing optical means of said collimated laser beam are carried by said working head at a controlled distance from said metallic material;
- means for adjusting the mutual position between said working head and said metallic material, adapted to conduct said focused laser beam along a working path on the metallic material comprising a succession of working areas,
- optical means for shaping the collimated laser beam including a deformable controlled surface reflecting element having a reflecting surface with a continuous curvature including a plurality of independently movable reflection areas, adapted to reflect said collimated laser beam, an arrangement of said plurality of independently movable reflection areas being adapted to establish the predetermined transverse power distribution of the focused laser beam at the working plane of the metallic material; and
- electronic processing and control means arranged to control the arrangement of said reflection areas to establish the predetermined transverse power distribution of the focused laser beam at the working plane of the metallic material based on the area of the working plane of the metallic material or a current direction of the working path on the metallic material,
wherein said electronic processing and control means comprises a nozzle adapted to direct a flow of an assist gas toward the working area on the material, and
wherein said electronic processing and control means are further arranged to:
- translate the axis of the assist gas flow relatively to a predetermined working path on the metallic material,
- detect a current position or a direction of the current translation of the axis of the assist gas flow, and automatically control the transverse power distribution of the laser beam based on the detected current position or the direction of the current translation of the axis of the assist gas flow.

* * * * *